US012689424B2

(12) United States Patent
Elshafie et al.

(10) Patent No.: US 12,689,424 B2
(45) Date of Patent: Jul. 21, 2026

(54) CLUSTERING OF RIS ELEMENTS

(71) Applicant: QUALCOMM Incorporated, San Diego, CA (US)

(72) Inventors: Ahmed Elshafie, San Diego, CA (US); Yu Zhang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 226 days.

(21) Appl. No.: 18/277,197

(22) PCT Filed: Apr. 28, 2021

(86) PCT No.: PCT/CN2021/090473
§ 371 (c)(1),
(2) Date: Aug. 14, 2023

(87) PCT Pub. No.: WO2022/226824
PCT Pub. Date: Nov. 3, 2022

(65) Prior Publication Data
US 2024/0120967 A1     Apr. 11, 2024

(51) Int. Cl.
H04B 7/06 (2006.01)
H01Q 15/14 (2006.01)
(Continued)

(52) U.S. Cl.
CPC ..... H04B 7/06952 (2023.05); H04B 7/04013 (2023.05)

(58) Field of Classification Search
CPC ............ H04B 7/06952; H04B 7/04013; H04B 7/0632; H04B 7/15528; H04B 17/328; H04B 17/336; H01Q 15/147; H04W 72/23
See application file for complete search history.

(56) References Cited

U.S. PATENT DOCUMENTS

2006/0069531 A1* 3/2006 Goldberg ................. H04B 7/10
                                                702/190
2021/0013619 A1   1/2021 Alkhateeb et al.
                  (Continued)

FOREIGN PATENT DOCUMENTS

CN       111093267 A     5/2020
CN       111245493 A     6/2020
              (Continued)

OTHER PUBLICATIONS

Yifei Yang et al. IEEE Global Communications Conference, Waikoloa, HI, USA (Year: 2019).*
(Continued)

*Primary Examiner* — Harry H Kim
(74) *Attorney, Agent, or Firm* — Procopio, Cory, Hargreaves & Savitch LLP

(57) ABSTRACT

A configuration for clustering of reconfigurable intelligent surface (RIS) elements. The apparatus receives, from an RIS controller, a cluster configuration of a RIS comprising a plurality of clusters. The apparatus performs a beam training procedure on the plurality of clusters of the RIS. The beam training procedure including transmission of a sequence of a plurality of reference signals to each cluster of the plurality of clusters. The apparatus transmits, to a base station, a feedback indication indicating an optimal configuration for each cluster of the plurality of clusters based at least on the beam training procedure. The apparatus receives a downlink signal reflected by a set or group of clusters of RIS from the base station.

27 Claims, 17 Drawing Sheets

(51) Int. Cl.
  *H04B 7/04*      (2017.01)
  *H04B 7/155*     (2006.01)
  *H04B 17/318*    (2015.01)
  *H04B 17/336*    (2015.01)
  *H04W 72/23*     (2023.01)

(56) References Cited

U.S. PATENT DOCUMENTS

| | | | | |
|---|---|---|---|---|
| 2021/0384637 A1* | 12/2021 | Sciancalepore | ...... | H01Q 15/148 |
| 2023/0209122 A1* | 6/2023 | Yao | ...... | H04B 7/0874 |
| | | | | 375/316 |
| 2024/0154646 A1* | 5/2024 | Wang | ...... | H01Q 19/104 |

FOREIGN PATENT DOCUMENTS

| | | |
|---|---|---|
| CN | 111416646 A | 7/2020 |
| WO | 2020254031 A1 | 12/2020 |

OTHER PUBLICATIONS

Changsheng You, IEEE Journal on Selected Areas in Communications, vol. 38, No. 11, Nov. 2020 (Year: 2020).*

Lin S., et al., "Reconfigurable Intelligent Surfaces with Reflection Pattern Modulation: Beamforming Design And Performance Analysis", IEEE Transactions on Wireless Communications, IEEE Service Center, Piscataway, NJ, US, vol. 20, No. 2, Oct. 8, 2020, pp. 741-754, XP011837317, p. 741-p. 747, Figure 1.

Supplementary European Search Report—EP21938310—Search Authority—Munich—Nov. 28, 2024.

Yang Y., et al., "Intelligent Reflecting Surface Meets OFDM: Protocol Design and Rate Maximization", arXiv:1906.09956v1 [cs.IT], Cornell University Library, 201 Olin Library Cornell University Ithaca, NY 14853, Jun. 21, 2019, pp. 1-30, XP081383557, p. 1-p. 19, figures 1-3.

You C., et al., "Channel Estimation and Passive Beamforming for Intelligent Reflecting Surface: Discrete Phase Shift and Progressive Refinement", arXiv:1912.10646v2 [cs.IT], IEEE Journal on Selected Areas in Communications, pp. 1-16, Mar. 24, 2020, pp. 1-16, XP055922073, p. 1-p. 8, figures 1-3.

International Search Report and Written Opinion—PCT/CN2021/090473 —ISA/EPO—Jan. 27, 2022.

ZTE, et al., "Support of Reconfigurable Intelligent Surface for 5G Advanced", 3GPP Draft, 3GPP TSG RAN Meeting #91e, RP-210618, Electronic Meeting, Mar. 16, 2021-Mar. 21, 2021, Mar. 15, 2021, 7 Pages, the whole document, pp. 2-6.

Tian X., et al., "Fast Beam Tracking for Reconfigurable Intelligent surface Assisted Mobile mmWave Networks", arXiv:2102.11414v1 [eess.SP], Feb. 22, 2021, pp. 1-11.

Yang Y., et al., "Intelligent Reflecting Surface Meets OFDM: Protocol Design and Rate Maximization", IEEE Transactions on Communications, vol. 68, No. 7, Jul. 2020, pp. 4522-4535.

You C., et al., "Fast Beam Training for IRS-Assisted Multiuser Communications", ArXiv:2005.11652v2 [cs.IT], Jun. 27, 2020, pp. 1-5.

* cited by examiner

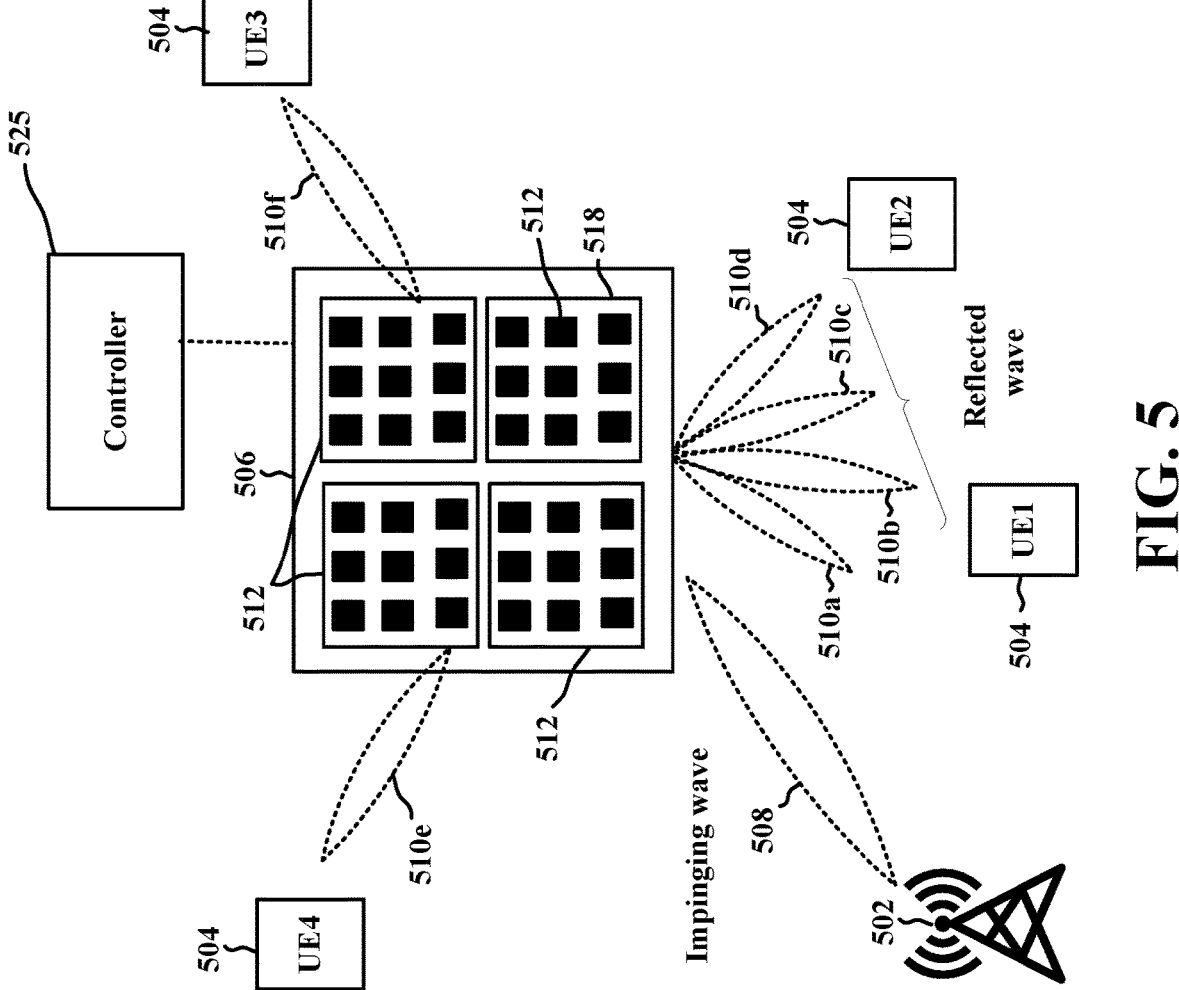
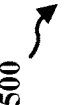
FIG. 5

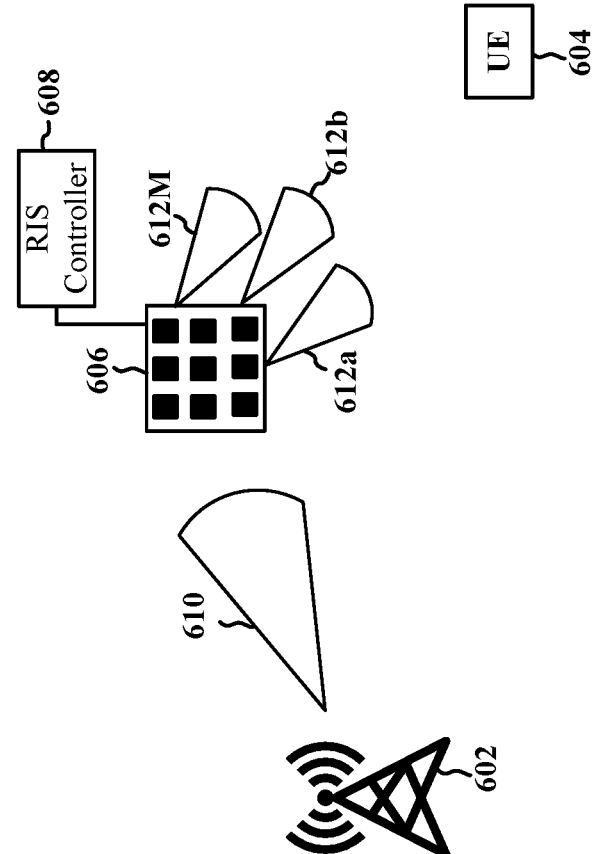
FIG. 6

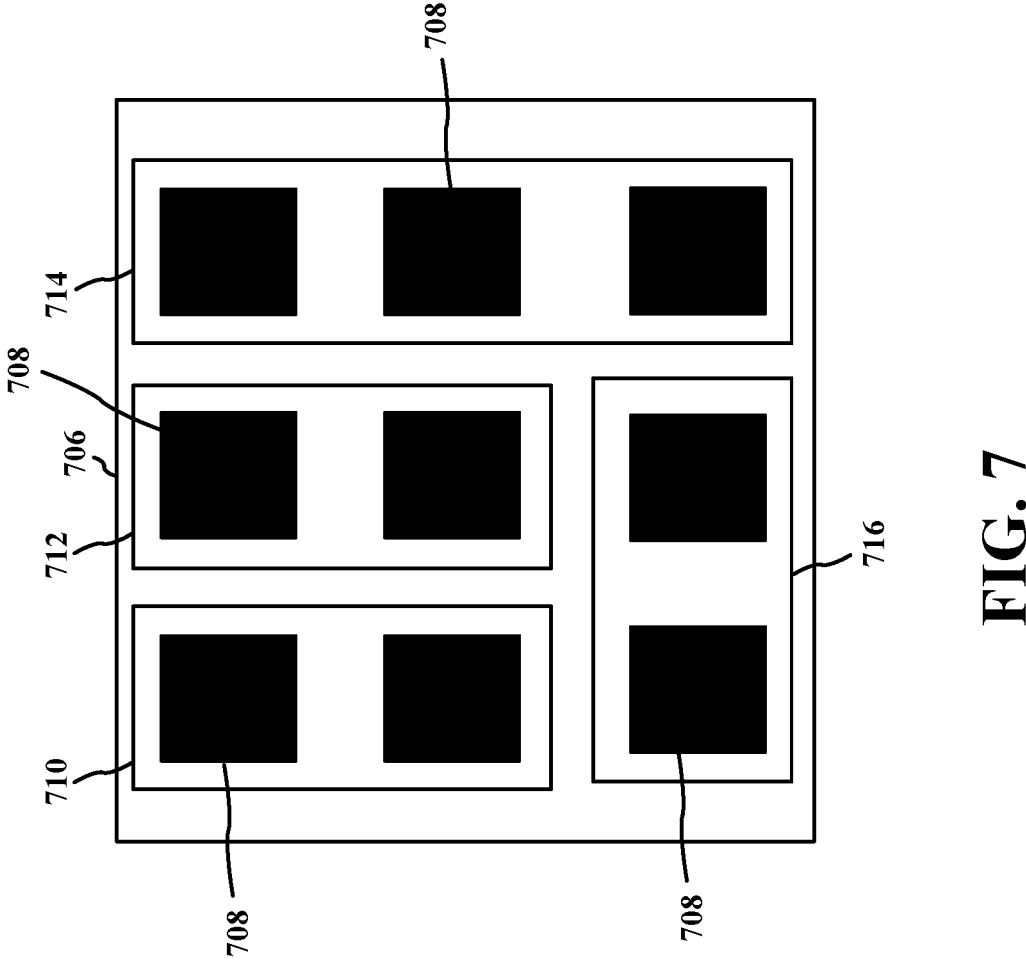
FIG. 7

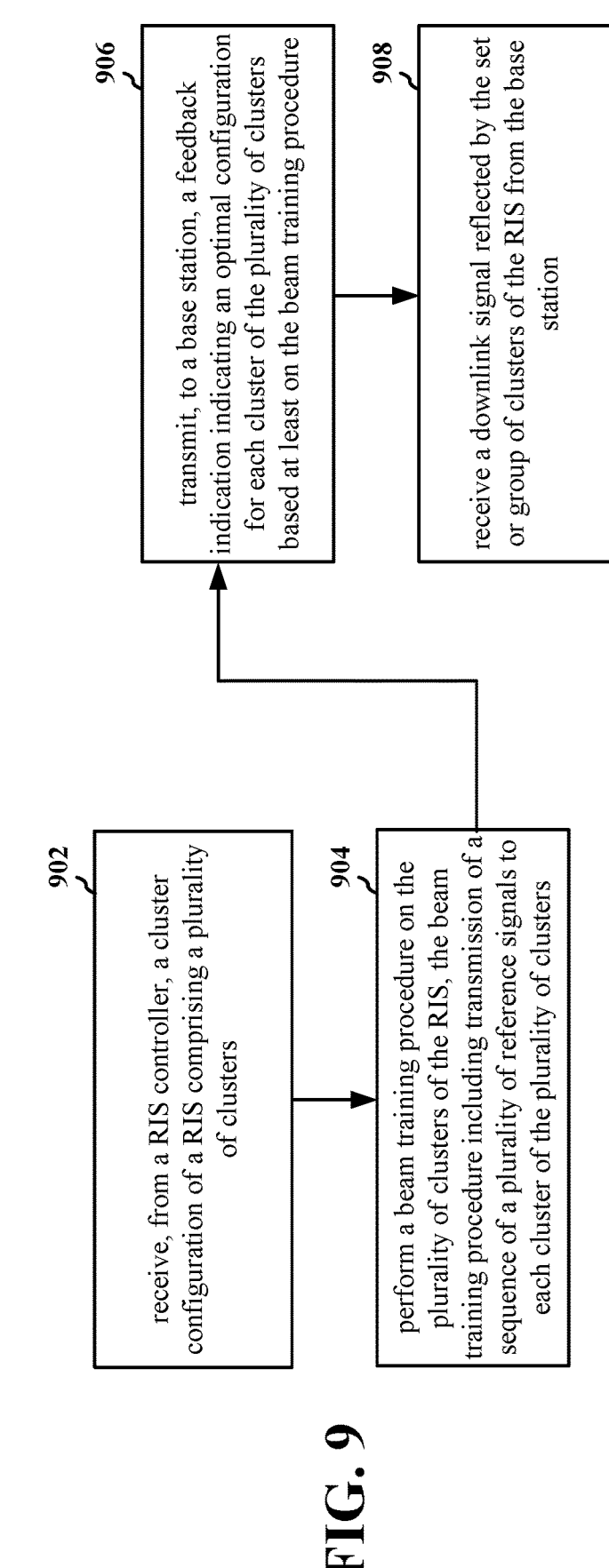

902 receive, from a RIS controller, a cluster configuration of a RIS comprising a plurality of clusters

904 perform a beam training procedure on the plurality of clusters of the RIS, the beam training procedure including transmission of a sequence of a plurality of reference signals to each cluster of the plurality of clusters

906 transmit, to a base station, a feedback indication indicating an optimal configuration for each cluster of the plurality of clusters based at least on the beam training procedure

908 receive a downlink signal reflected by the set or group of clusters of the RIS from the base station

Figure 10:
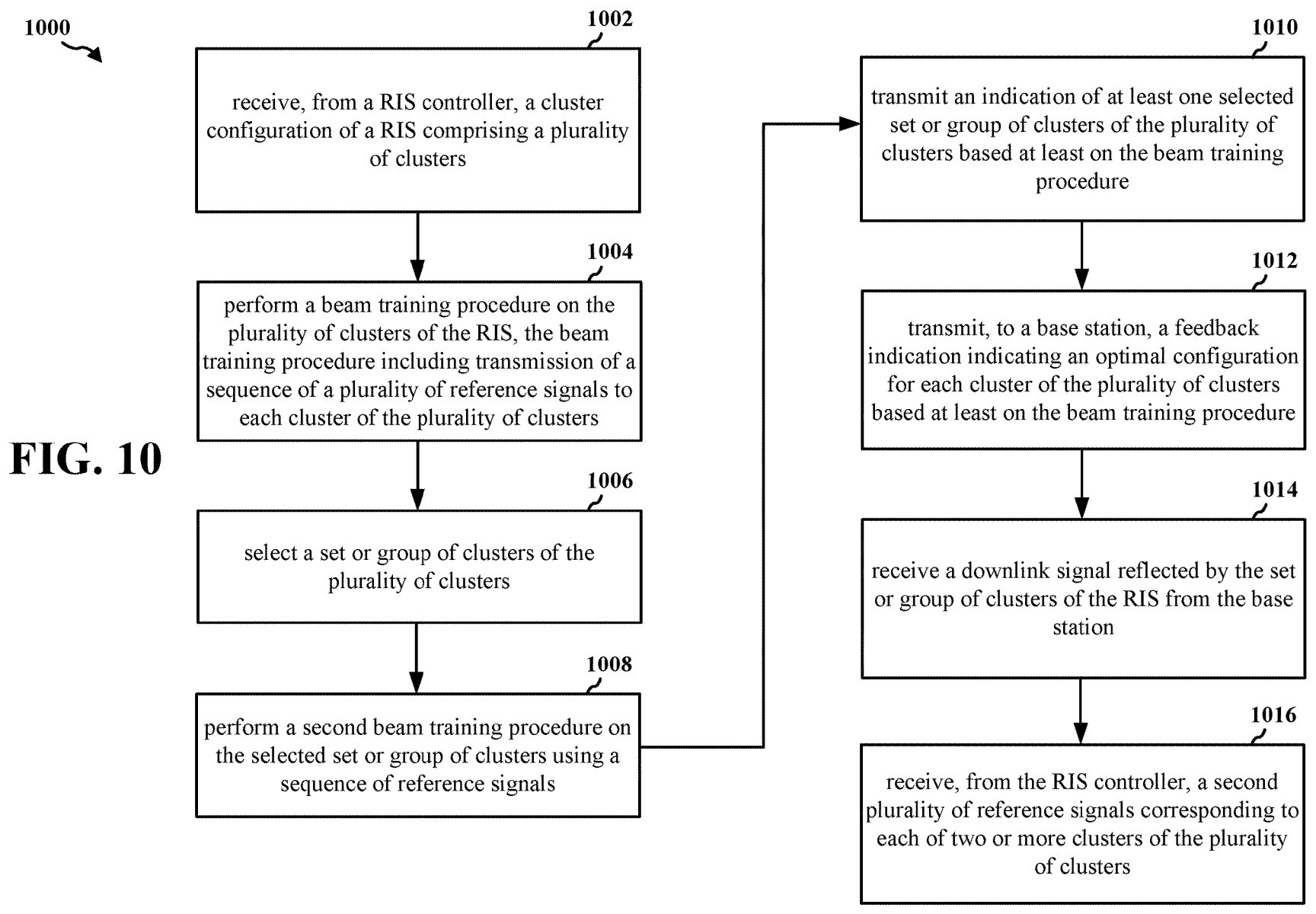

1002 — receive, from a RIS controller, a cluster configuration of a RIS comprising a plurality of clusters 1004 — perform a beam training procedure on the plurality of clusters of the RIS, the beam training procedure including transmission of a sequence of a plurality of reference signals to each cluster of the plurality of clusters 1006 — select a set or group of clusters of the plurality of clusters 1008 — perform a second beam training procedure on the selected set or group of clusters using a sequence of reference signals 1010 — transmit an indication of at least one selected set or group of clusters of the plurality of clusters based at least on the beam training procedure 1012 — transmit, to a base station, a feedback indication indicating an optimal configuration for each cluster of the plurality of clusters based at least on the beam training procedure 1014 — receive a downlink signal reflected by the set or group of clusters of the RIS from the base station 1016 — receive, from the RIS controller, a second plurality of reference signals corresponding to each of two or more clusters of the plurality of clusters

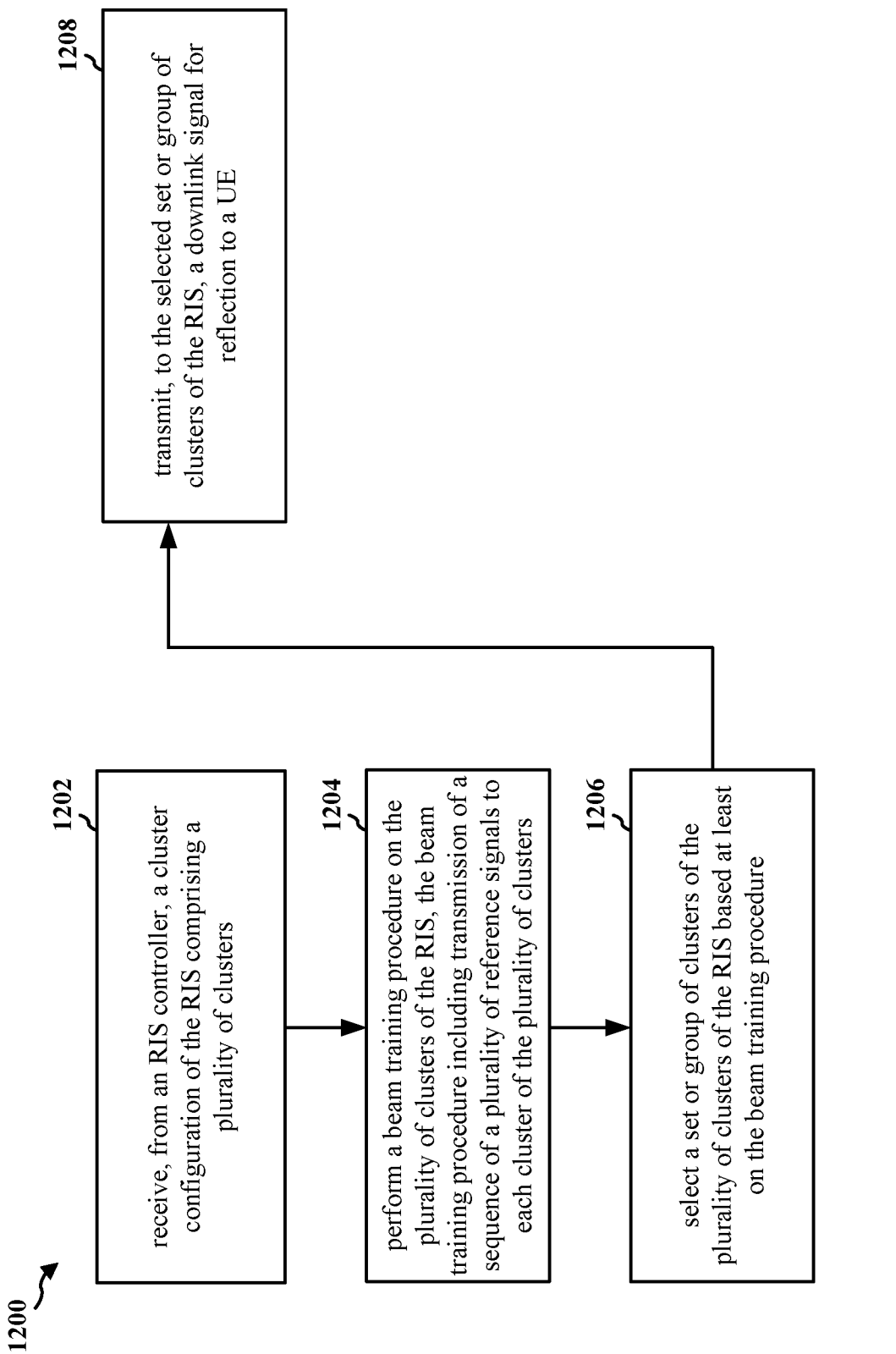

1200

1202
receive, from an RIS controller, a cluster configuration of the RIS comprising a plurality of clusters 1204
perform a beam training procedure on the plurality of clusters of the RIS, the beam training procedure including transmission of a sequence of a plurality of reference signals to each cluster of the plurality of clusters 1206
select a set or group of clusters of the plurality of clusters of the RIS based at least on the beam training procedure 1208
transmit, to the selected set or group of clusters of the RIS, a downlink signal for reflection to a UE

FIG. 12

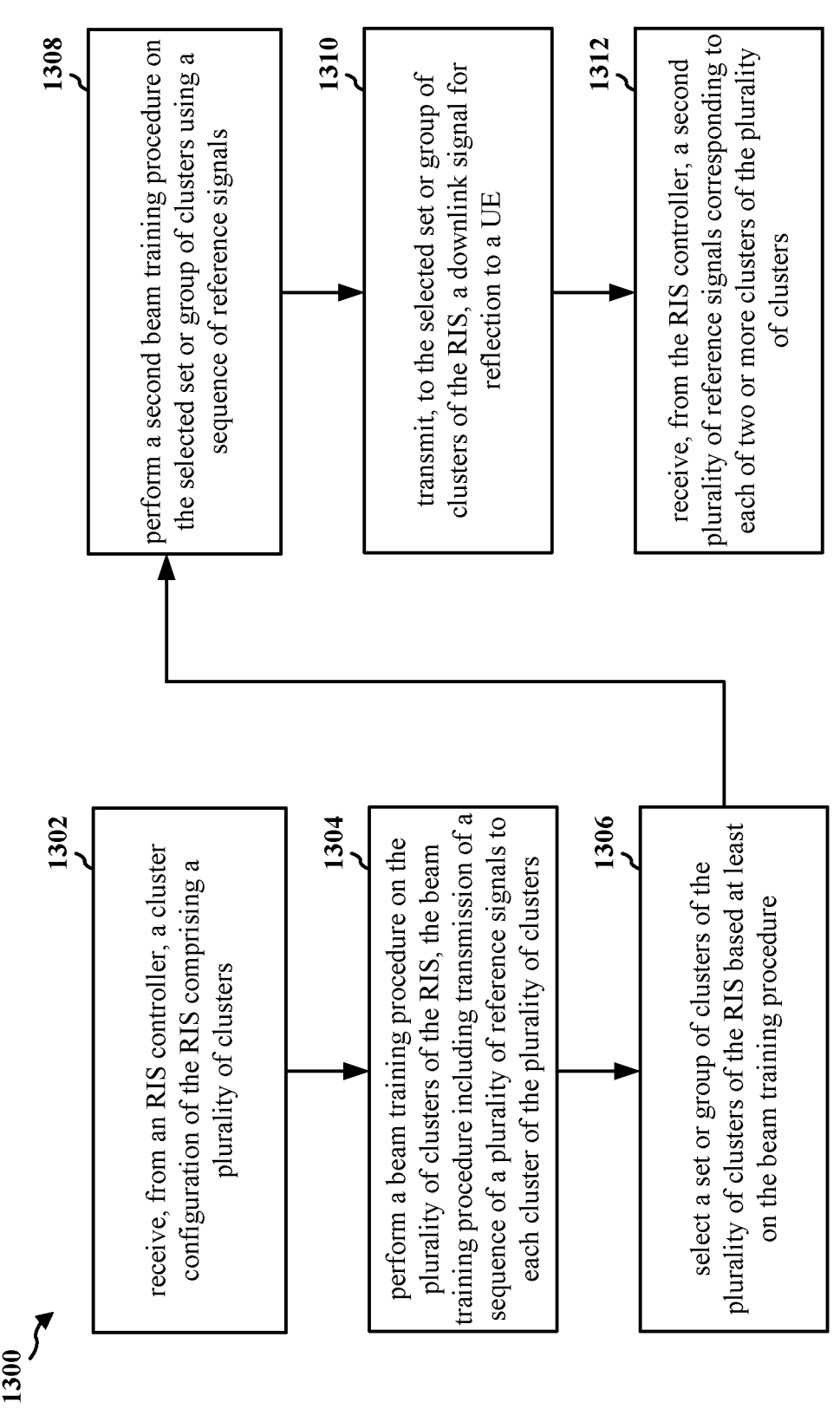

1302 receive, from an RIS controller, a cluster configuration of the RIS comprising a plurality of clusters

1304 perform a beam training procedure on the plurality of clusters of the RIS, the beam training procedure including transmission of a sequence of a plurality of reference signals to each cluster of the plurality of clusters

1306 select a set or group of clusters of the plurality of clusters of the RIS based at least on the beam training procedure

1308 perform a second beam training procedure on the selected set or group of clusters using a sequence of reference signals

1310 transmit, to the selected set or group of clusters of the RIS, a downlink signal for reflection to a UE

1312 receive, from the RIS controller, a second plurality of reference signals corresponding to each of two or more clusters of the plurality of clusters

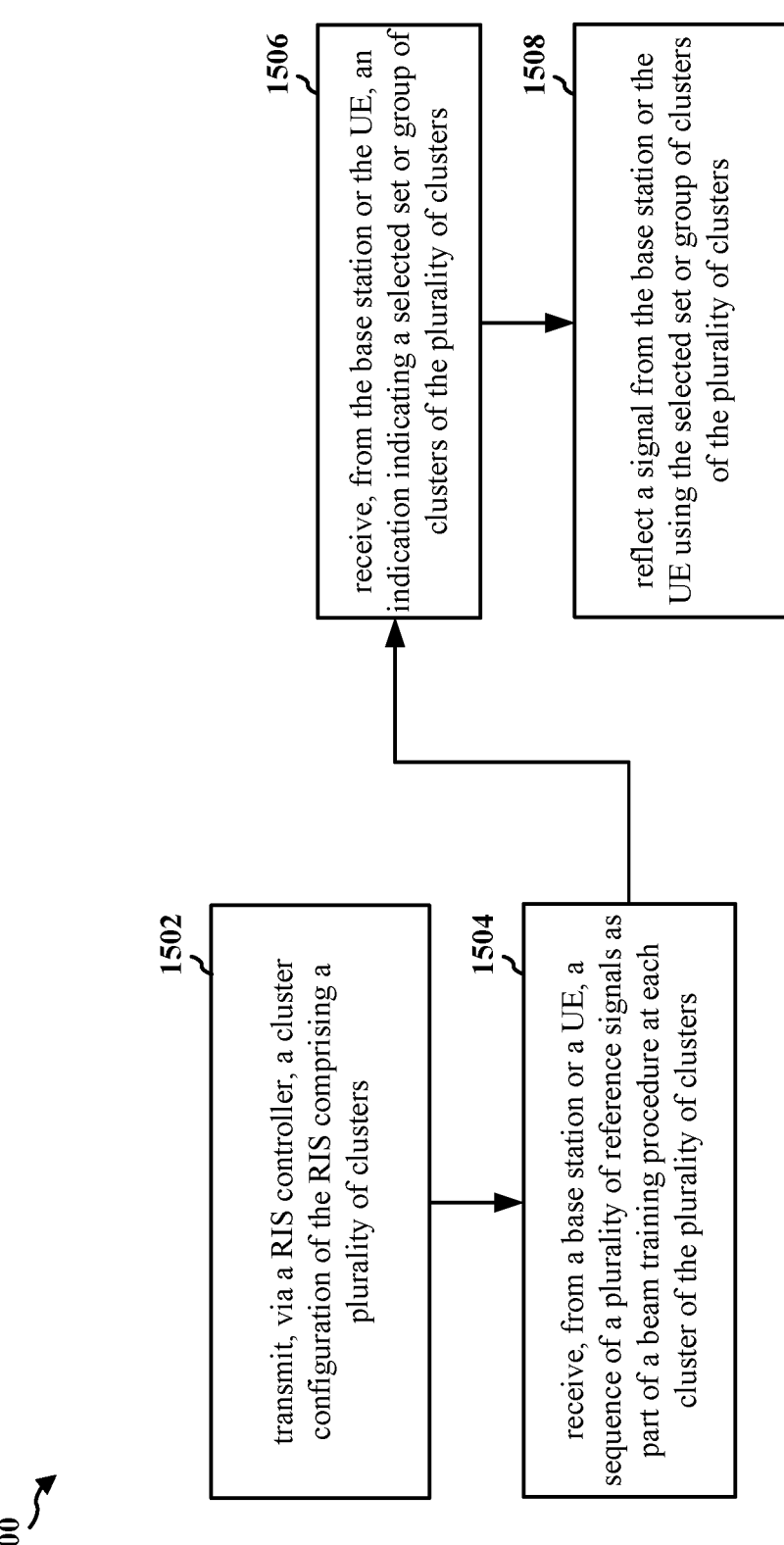

1500

1502 transmit, via a RIS controller, a cluster configuration of the RIS comprising a plurality of clusters 1504 receive, from a base station or a UE, a sequence of a plurality of reference signals as part of a beam training procedure at each cluster of the plurality of clusters 1506 receive, from the base station or the UE, an indication indicating a selected set or group of clusters of the plurality of clusters 1508 reflect a signal from the base station or the UE using the selected set or group of clusters of the plurality of clusters

FIG. 15

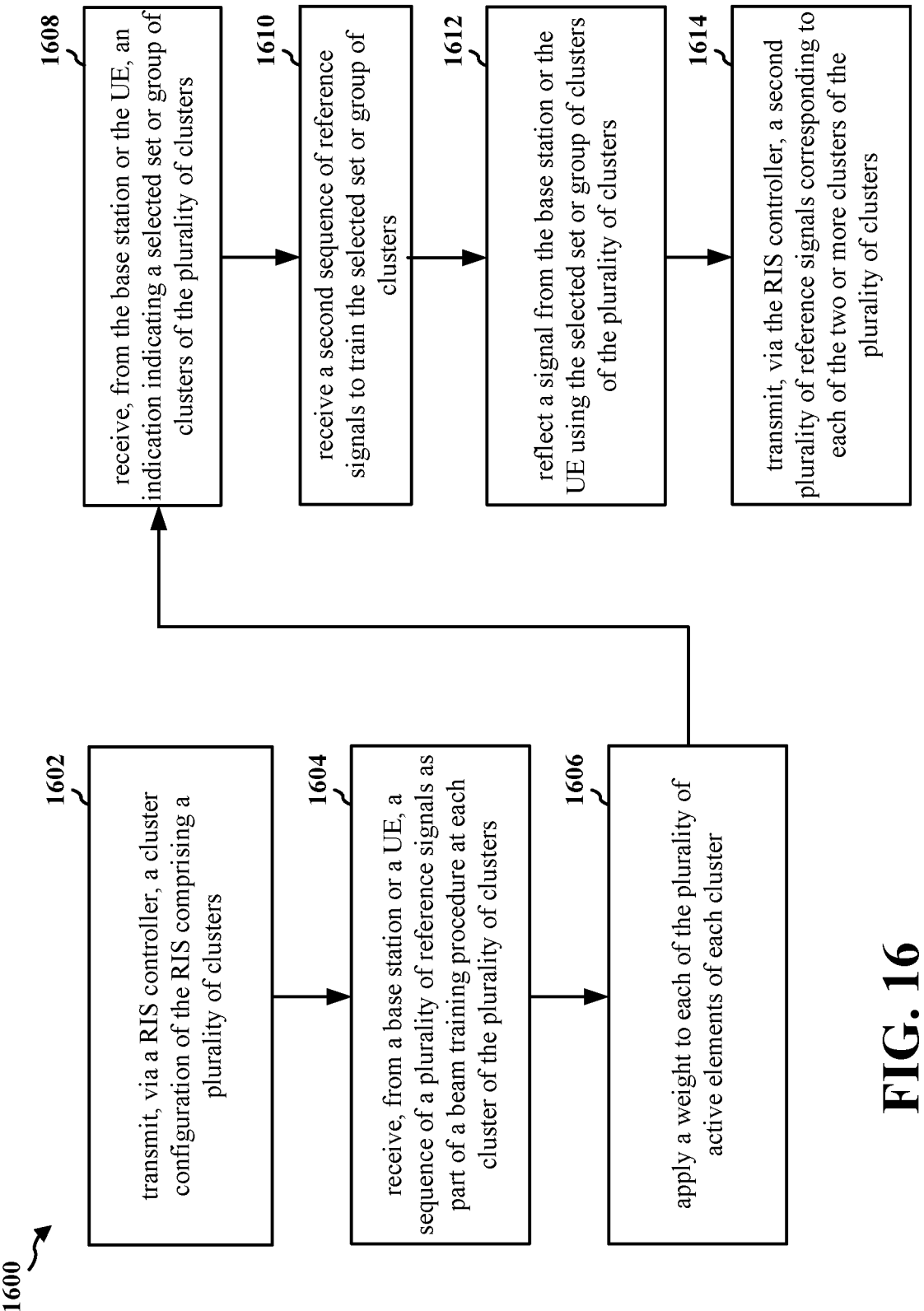

1600

1602 transmit, via a RIS controller, a cluster configuration of the RIS comprising a plurality of clusters

1604 receive, from a base station or a UE, a sequence of a plurality of reference signals as part of a beam training procedure at each cluster of the plurality of clusters

1606 apply a weight to each of the plurality of active elements of each cluster

1608 receive, from the base station or the UE, an indication indicating a selected set or group of clusters of the plurality of clusters

1610 receive a second sequence of reference signals to train the selected set or group of clusters

1612 reflect a signal from the base station or the UE using the selected set or group of clusters of the plurality of clusters

1614 transmit, via the RIS controller, a second plurality of reference signals corresponding to each of the two or more clusters of the plurality of clusters

FIG. 16

CLUSTERING OF RIS ELEMENTS

CROSS REFERENCE TO RELATED APPLICATION(S)

This application is a National Stage Application filed under 35 U.S.C. § 371 of PCT International Application No. PCT/CN2021/090473, entitled "CLUSTERING OF RIS ELEMENTS" and filed Apr. 28, 2021, which is expressly incorporated by reference herein in its entirety.

BACKGROUND

Technical Field

The present disclosure relates generally to communication systems, and more particularly, to a configuration for clustering of reconfigurable intelligent surface (RIS) elements.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may be a device at a UE. The device may be a processor and/or a modem at a UE or the UE itself. The apparatus receives, from a reconfigurable intelligent surface (RIS) controller, a cluster configuration of the RIS comprising a plurality of clusters. The apparatus performs a beam training procedure on the plurality of clusters of the RIS. The beam training procedure including transmission of a sequence of a plurality of reference signals to each cluster of the plurality of clusters. The apparatus transmits, to a base station, a feedback indication indicating an optimal configuration for each cluster of the plurality of clusters based at least on the beam training procedure. The apparatus receives a downlink signal reflected by a set or group of clusters of the RIS from the base station.

In an aspect of the disclosure, a method, a computer-readable medium, and an apparatus are provided for wireless communication at a base station. The apparatus may be a device at a base station. The device may be a processor and/or a modem at a base station or the base station itself. The apparatus receives, from a reconfigurable intelligent surface (RIS) controller, a cluster configuration of the RIS comprising a plurality of clusters. The apparatus performs a beam training procedure on the plurality of clusters of the RIS. The beam training procedure including transmission of a sequence of a plurality of reference signals to each cluster of the plurality of clusters. The apparatus selects a set or group of clusters of the plurality of clusters of the RIS based at least on the beam training procedure. The apparatus transmits, to the selected set or group of clusters of the RIS, a downlink signal for reflection to a UE.

In an aspect of the disclosure, a method, a computer-readable medium, and an apparatus are provided for wireless communication at an RIS. The apparatus may be a device at an RIS. The device may be a processor and/or a modem at an RIS or the RIS itself. The apparatus transmits, via a RIS controller, a cluster configuration of the RIS comprising a plurality of clusters. The apparatus receives, from a base station or a user equipment (UE), a sequence of a plurality of reference signals as part of a beam training procedure at each cluster of the plurality of clusters. The apparatus receives, from the base station or the UE, an indication indicating a selected set or group of clusters of the plurality of clusters. The apparatus reflects a signal from the base station to the UE using the selected set or group of clusters of the plurality of clusters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5 is a diagram illustrating an RIS that intelligently reflects communication between a base station and a UE.

FIG. 6 is a diagram illustrating an example of reference signal based precoder selection for an RIS.

FIG. 7 is a diagram illustrating an example of a RIS having multiple clusters.

FIG. 9 is a flowchart of a method of wireless communication.

FIG. 10 is a flowchart of a method of wireless communication.

FIG. 12 is a flowchart of a method of wireless communication.

FIG. 13 is a flowchart of a method of wireless communication.

FIG. 15 is a flowchart of a method of wireless communication.

FIG. 16 is a flowchart of a method of wireless communication.

DETAILED DESCRIPTION

Figure 1:
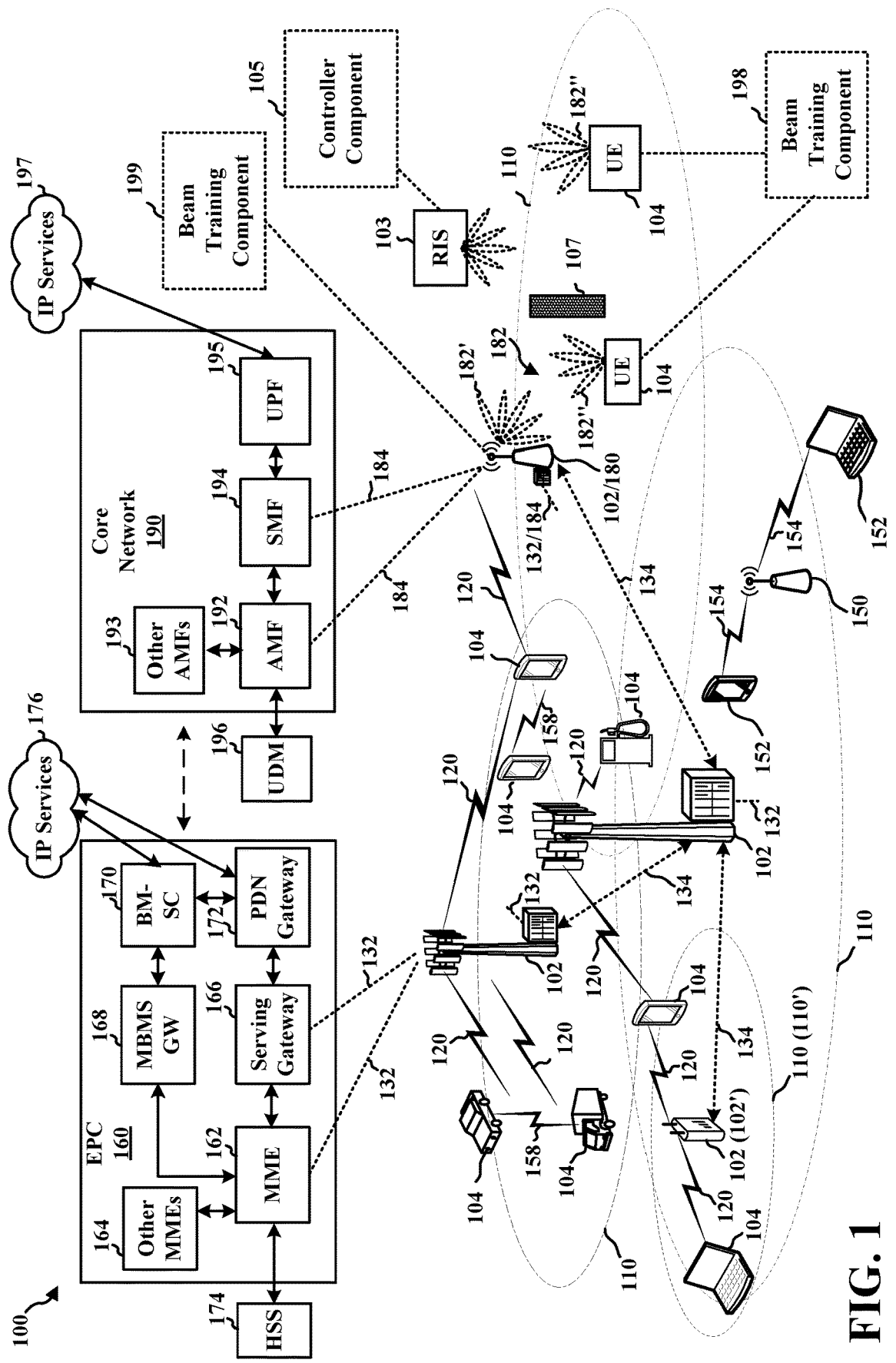
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE

104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a sub- scriber unit, a wireless unit, a remote unit, a mobile device, a wireless device, a wireless communications device, a remote device, a mobile subscriber station, an access termi- nal, a mobile terminal, a wireless terminal, a remote termi- nal, a handset, a user agent, a mobile client, a client, or some other suitable terminology.

Referring again to FIG. 1, in certain aspects, the UE 104 may be configured to train a cluster of active elements of a plurality of clusters of an RIS. For example, the UE 104 may comprise a beam training component 198 configured to train a cluster of active elements of a plurality of clusters of an RIS. The UE 104 may receive, from an RIS controller, a cluster configuration of an RIS comprising a plurality of clusters. The UE 104 may perform a beam training proce- dure on the plurality of clusters of the RIS, the beam training procedure including transmission of a sequence of a plural- ity of reference signals to each cluster of the plurality of clusters. The UE 104 may transmit, to a base station 180, a feedback indication indicating an optimal configuration for each cluster of the plurality of clusters based at least on the beam training procedure. The UE 104 may receive a down- link signal reflected by a set or group of clusters of the RIS from the base station 180.

Referring again to FIG. 1, in certain aspects, the base station 180 may be configured to train a cluster of active elements of a plurality of clusters for an RIS. For example, the base station 180 may comprise beam training component 199 configured to train a cluster of active elements of a plurality of clusters for an RIS. The base station 180 may receive, from an RIS controller, a cluster configuration of the RIS comprising a plurality of clusters. The base statin 180 may perform a beam training procedure on the plurality of clusters of the RIS, the beam training procedure including transmission of a sequence of a plurality of reference signals to each cluster of the plurality of clusters. The base station 180 may select a set or group of clusters of the plurality of clusters of the RIS based at least on the beam training procedure. The base station 180 may transmit, to the selected set or group of clusters of the RIS, a downlink signal for reflection to a UE.

Referring again to FIG. 1, in certain aspects, the RIS 103 may be configured to allow for a plurality of clusters of the RIS to be trained by a base station or a UE. For example, RIS 103 may comprise a controller component 105 configured to allow for a plurality of clusters of an RIS to be trained by a base station or a UE. The RIS 103 may transmit, via a RIS controller, a cluster configuration of the RIS comprising a plurality of clusters. The RIS 103 may receive, from a base station or a user equipment (UE), a sequence of a plurality of reference signals as part of a beam training procedure at each cluster of the plurality of clusters. The RIS 103 may receive, from the base station or the UE, an indication indicating a selected set or group of clusters of the plurality of clusters. The RIS 103 may reflect a signal from the base station or the UE using the selected set or group of clusters of the plurality of clusters.

Although the following description may be focused on 5G NR, the concepts described herein may be applicable to other similar areas, such as LTE, LTE-A, CDMA, GSM, and other wireless technologies.

Figures 2A, 2B, 2C, 2D:
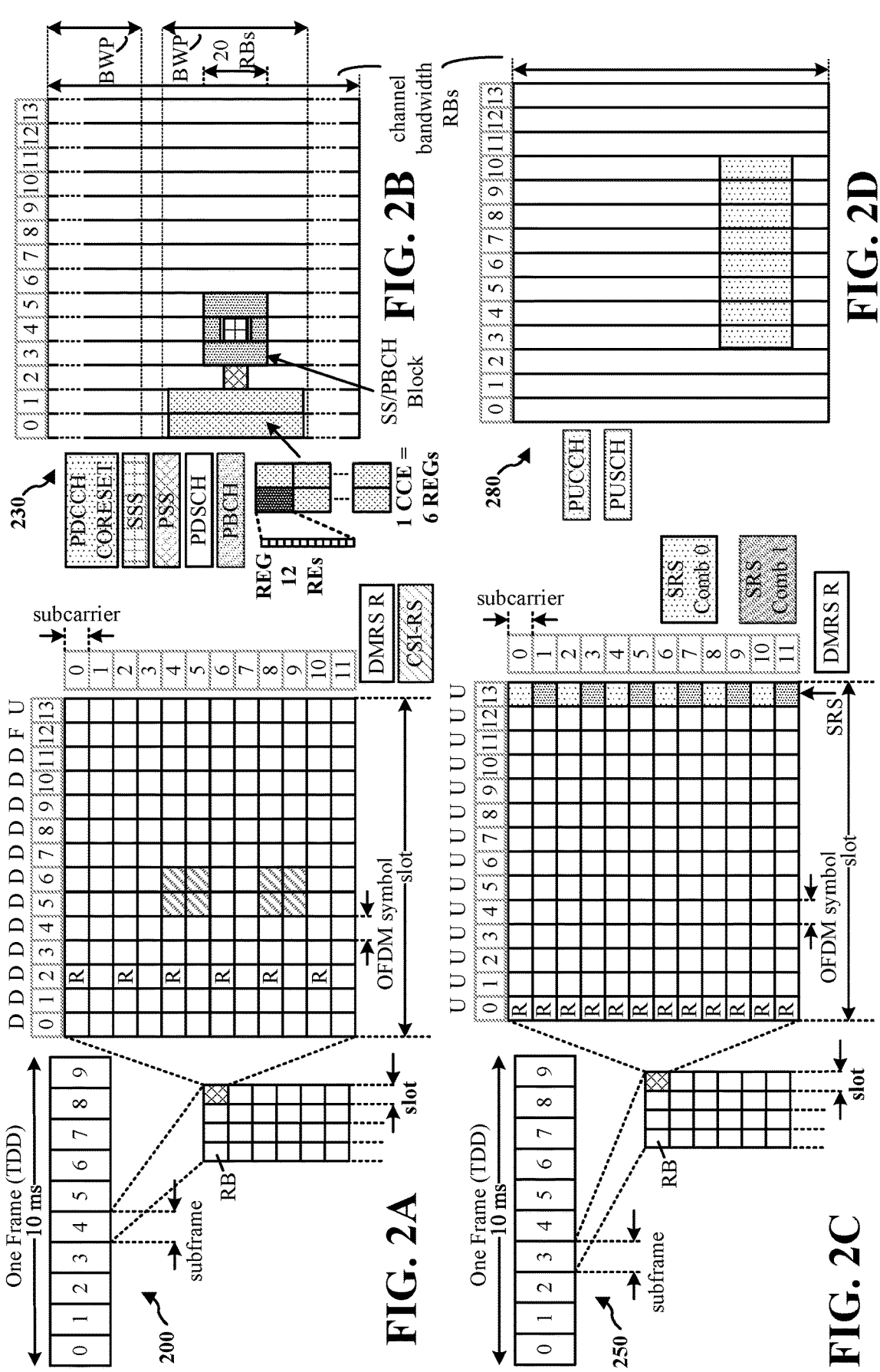
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the descrip- tion infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multi- plexing (OFDM) (CP-OFDM) symbols. The symbols on UL may be CP-OFDM symbols (for high throughput scenarios) or discrete Fourier transform (DFT) spread OFDM (DFT-s- OFDM) symbols (also referred to as single carrier fre- quency-division multiple access (SC-FDMA) symbols) (for power limited scenarios; limited to a single stream trans- mission). The number of slots within a subframe is based on the slot configuration and the numerology. For slot configu- ration 0, different numerologies $\mu$ 0 to 4 allow for 1, 2, 4, 8, and 16 slots, respectively, per subframe. For slot configu- ration 1, different numerologies 0 to 2 allow for 2, 4, and 8 slots, respectively, per subframe. Accordingly, for slot con- figuration 0 and numerology $\mu$, there are 14 symbols/slot and $2^{\mu}$ slots/subframe. The subcarrier spacing and symbol length/duration are a function of the numerology. The sub- carrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
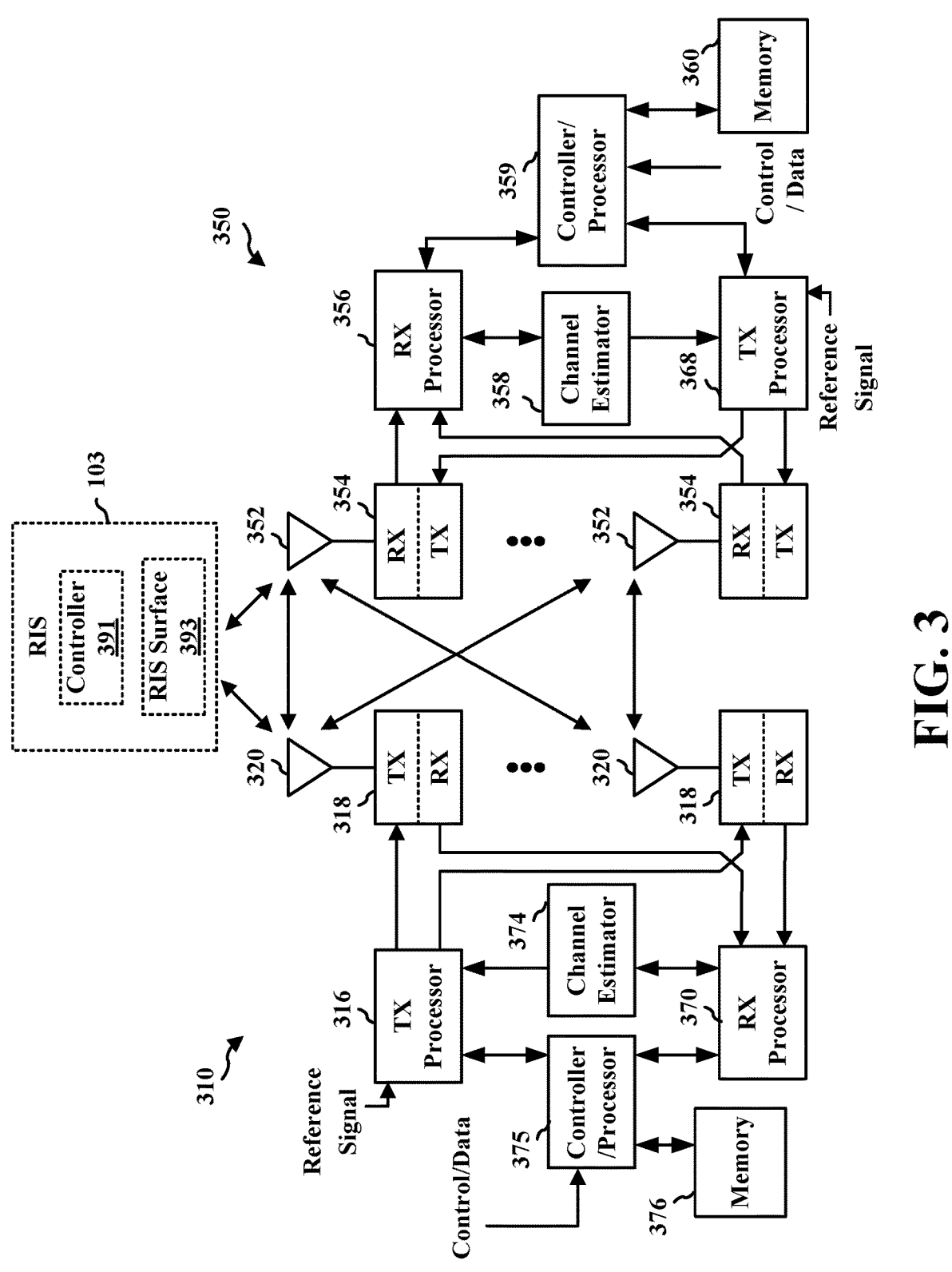
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

In some aspects, communication may be provided between the base station and the UE by an RIS 103, such as described in connection with any of FIG. 1 or FIGS. 4-14. The communication may be intelligently reflected, e.g., by an RIS surface 393 of the RIS 103.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with beam training component 198 or 199, or the controller component 105 of FIG. 1.

At least one of the TX processor 316, the RX processor 370, and the controller/processor 375 may be configured to perform aspects in connection with beam training component 198 or 199, or the controller component 105 of FIG. 1.

Massive MIMO may help to increase throughput in a wireless communication system. Beamforming gain may be achieved through the use of active antenna units. Individual RF chains may be used per antenna port. The use of active antenna units (AAU) may increase power consumption. A reconfiguration intelligent surface (RIS) may be employed to extend coverage, e.g., beamformed coverage, with reduced power consumption. The RIS may include a larger number of uniformly distributed electrically controllable elements. Each RIS element may have a reconfigurable electromagnetic characteristic, e.g., a reflection coefficient. Depending on the combination of configured states of the elements, the RIS may reflect and modify the incident radio waveform in a controlled manner, such as changing a reflected direction, changing a beam width, etc. The RIS may function as a near passive device, and the reflection direction may be controlled by the base station. The RIS may reflect an impinging wave in a direction indicated by the base station to a UE.

An RIS may be deployed in wireless communication systems, including cellular systems, such as LTE, NR, etc. An RIS may alter the channel realization in a controlled manner, which may improve channel diversity. The increased diversity may provide robustness to channel blocking/fading, which may be of particular importance for mmWave communication. Compared to a wireless relay or repeater systems, an RIS may be more cost and energy efficient.

Figures 4A, 4B:
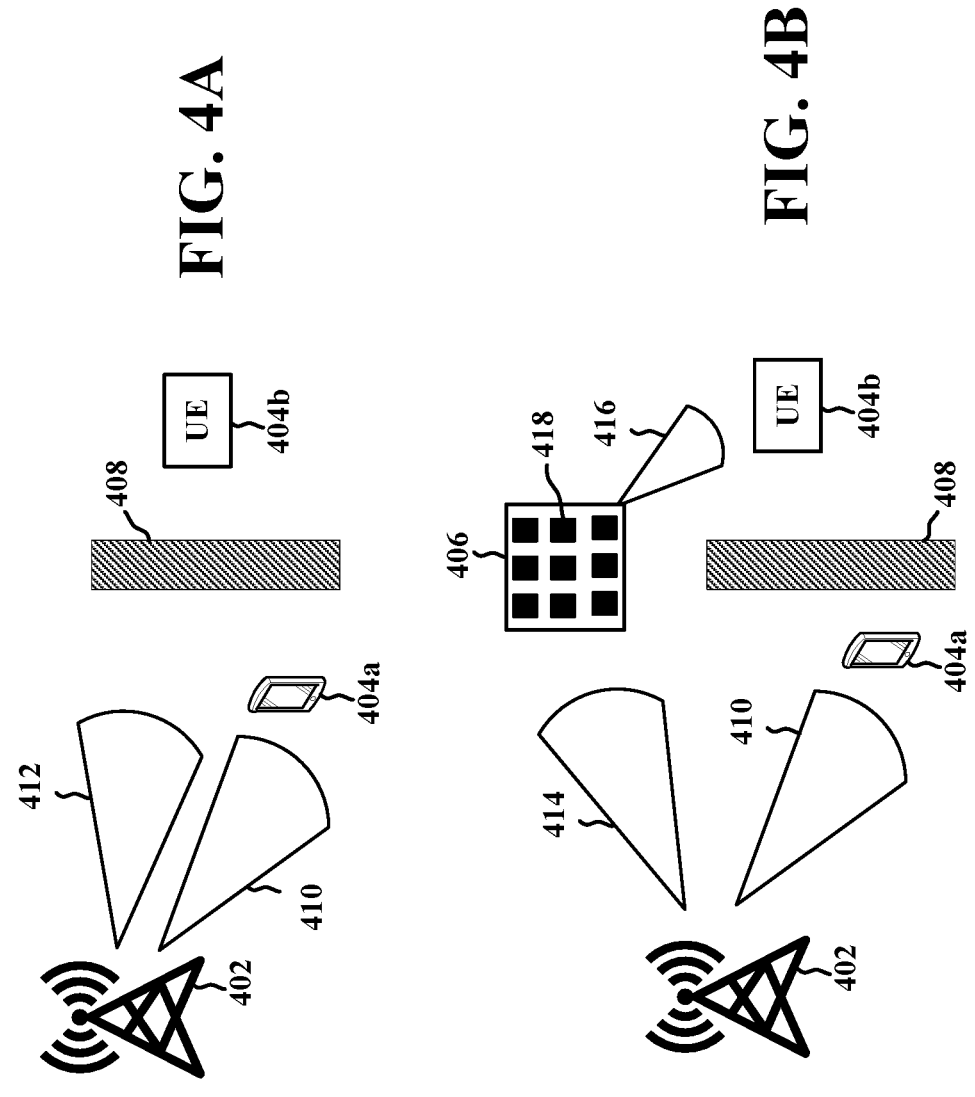
FIG. 4A is a diagram illustrating a blockage to wireless communication between a base station and a UE.
FIG. 4B is a diagram illustrating an RIS that intelligently reflects communication between a base station and a UE.

A base station may control the RIS to extend beam coverage and/or to address blockages between the base station and the UE. FIG. 4A illustrates an example in which a base station 402 transmits beamformed communication to UEs using directional beams 410, 412. A first UE 404a may be able to receive the direct transmission using the beam 410. However, FIG. 4A illustrates a blockage 408 that blocks the beam 412 from reception at the second UE 404b. As illustrated in FIG. 4B, the base station 402 may transmit communication for the second UE 404b using a directional beam 414 (which may be referred to as the impinging beam) to the RIS 406 for reflection over a directional beam 416 to the UE 404*b*. The base station 402 may indicate the beam direction 416 to the RIS, and the RIS may reflect the impinging wave on beam 414 in the direction of the beam 416.

The RIS may include multiple RIS elements 418 that are configuration to adjust the reflected direction, the beam width, etc. FIG. 5 illustrates an example in which the RIS 506 includes multiple subsets or clusters 512 of multiple RIS elements 518. As illustrated, different subsets or clusters 512 of RIS elements 518 may serve different UEs 504. The RIS elements 518 may be controlled by a controller 525 at the RIS 506 based on control information received by the base station 502. As described in connection with FIG. 4B, the base station 502 may indicate a beam direction (e.g., any of 510*a*, 510*b*, 510*c*, 510*d*, 510*e*, or 510*f*) to the RIS for reflecting beamformed communication received as the impinging wave 508 to a particular UE 104 in a particular direction. The RIS may similarly be controlled by a UE for reflecting communication from the UE to a base station and/or to another UE.

The RIS may utilize a reference signal based precoder selection process to determine the best precoding for reflecting a signal. FIG. 6 illustrates an example in which the base station 602 sounds a RIS 606 with multiple reference signals 610. For example, the base station 602 transmits a plurality of reference signals 610 to the RIS 606. The RIS may reflect the reference signals to the UE 604. While reflecting the reference signals, the RIS may use certain reflecting matrix where the elements of the matrix may include weights comprising a phase only or a phase and amplitude. For example, beam 612*a* may include a first weight, beam 612*b* may include a second weight, and the process is repeated M times, such that beam 612M may include Mth weight. The UE 604 may send an indication, to the base station 602 and/or the RIS controller 608 of the RIS 606, of the best received reference signals in terms of the energy accumulation, signal to noise ratio (SNR), signal to interference plus noise ratio (SINR), modulation and coding scheme (MCS), channel quality indicator (CQI), reference signal received power (RSRP), reference signal received quality (RSRQ). Based on the indication, the RIS controller 608 and the base station 602 may determine the best configuration at the RIS 606 for reflecting a signal to the UE 604.

However, the RIS 606 may comprise a vast amount of active elements and updating the weights of the active elements quickly may take a long time, which may impact performance of the RIS. When there is a vast amount of active elements at the RIS, the time needed to update the weights may be lengthy, and may also increase the complexity in training the weights for the active elements.

Aspects provided herein provide a configuration for clustering elements of an RIS. The clustering of elements of the RIS may allow for a UE or a base station to perform a beam training process on a cluster of elements instead of the entire amount of elements of the RIS, which may reduce the amount of elements that are trained in the beam training process and may reduce the time for the beam training process.

With reference to the diagram 700 of FIG. 7, the RIS 706 may comprise a plurality of clusters 710, 712, 714, 716, where each cluster comprises a plurality of elements 708. In some instances, the RIS may be configured to send a configuration indicating the amount of clusters (e.g., 710, 712, 714, 716), where each cluster comprises a plurality of elements. For each cluster and transmission-reception beam pair, there may be a beam training comprised of size K reference signals. A set of or a group of clusters of the RIS may be selected based on the beam training. A second beam training process may then be performed on the selected set or group of clusters. This may allow for a two-level beam training process. In some instances, the first level may utilize a reduced amount of reference signals than the second level of beam training. The first level may use a reduced amount of reference signals due to beam training each of the plurality of clusters. The two-level beam training process may quickly update weights for the elements of the selected set or group of clusters, due to a reduced amount of active elements being trained. In some instances, the base station may transmit a signal (e.g., RRC, MAC-CE, DCI) to the RIS on which cluster to be used as needed.

In some instances, if two or more clusters (e.g., 710, 712, 714, 716) are configured to be utilized at the same time, then an additional beam training process may be performed to refine the previously obtained weights. For example, if cluster 710 and 716 are activated and were beam trained separately, if the RIS 706 will be configured to use them at the same time, then a new set of training signals may be used.

In some instances, for a better selection of the weights, and assuming M training occasions, the weights quality of using $\alpha N$, where $\alpha < 1$, elements is better than using $\beta N$ ($\beta < 1$) elements, where $\alpha < \beta$. Also, updating more elements may require more processing time and delays at the RIS. The RIS controller may select a ceiling or floor of $\alpha N$, and once achieved, the RIS may use those elements. In some instances, the number of clusters and the number of elements per group may change based on the link between the RIS and the base station or UE (e.g., sidelink, PC5, or Uu). In some instances, the $\alpha$ if the optimization is done such that the RIS selects the best non-zero elements in the grid such that the number does not exceed $\alpha N$ may change based on the link. The quality of service of the transmission/application may play a rule on that aspect.

In some instances, a random selection of clusters to be activated may be based on a probability p1. Within a cluster, the RIS controller may randomly select if an element is on or off with a probability p2, where p2 is the probability that an element is active or on. Then, based on the assumption that a cluster k was selected, then two options are available. A first option may include no constraints on the number of elements per cluster. A second option may include stopping when $N_A \leq N_k$ are selected where $N_k$ is the number of element of cluster k. The base station or the UE (e.g., sidelink or PC5) may help the RIS to optimize and configure p1, p2, and the number of elements $N_k$ base at least on the transmission-reception beam pair, the quality of application signals, the energy requirements at the RIS, or the capability of the RIS to keep many elements active and change phase and/or amplitude rapidly, in a timely manner. In some instances, the base station may signal the values of p1, p2, and/or $N_A$.

In some instances, where one cluster may be forced to be on, joint events may be defined where one element is on. For example, assume T clusters, the event that cluster "k" is on is a binary vector of (0, 0, 1, 0, . . . , 0) with only one element being 1 is generated at cluster k. In some instances, the probability that the cluster k is on may be Pk, while all the other clusters are off. The selected clusters and elements within the cluster may be on, and those being off, should stay like that for a period of time X, which is agreed by the RIS controller and the base station and/or monitoring UE. The period of time X may be configured via RRC, MAC-CE, DCI, or SCI, or a combination thereof.

Figure 8:
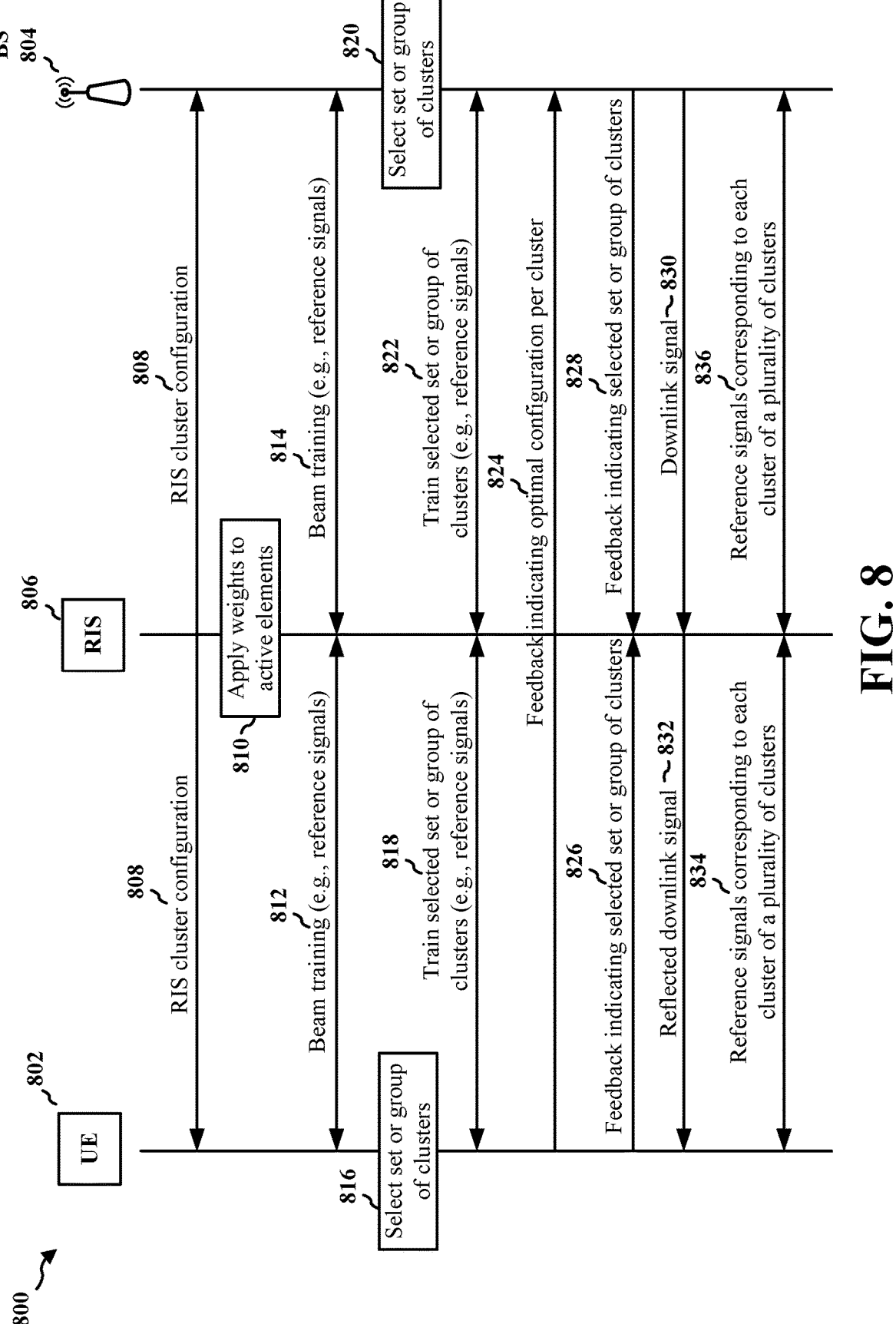
FIG. 8 is a call flow diagram of signaling between a base station, a UE, and an RIS.
Figure 11:
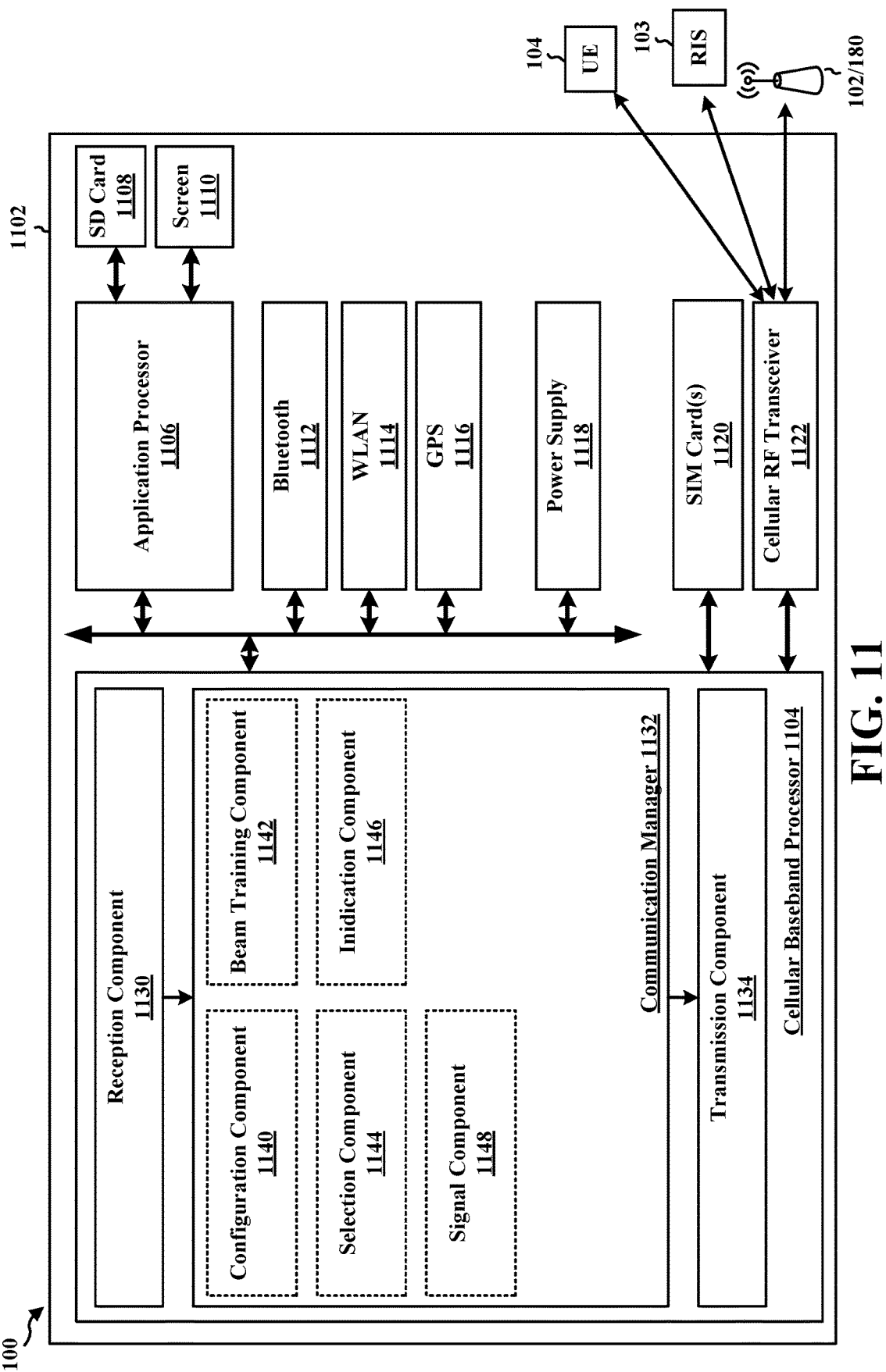
FIG. 11 is a diagram illustrating an example of a hardware implementation for an example apparatus.

FIG. 8 is a call flow diagram 800 of signaling between a UE 802, a base station 804, and an RIS 806. The base station 804 may be configured to provide at least one cell. The UE 802 may be configured to communicate with the base station 804. For example, in the context of FIG. 1, the base station 804 may correspond to base station 102/180 and, accordingly, the cell may include a geographic coverage area 110 in which communication coverage is provided and/or small cell 102' having a coverage area 110'. Further, a UE 802 may correspond to at least UE 104. In another example, in the context of FIG. 3, the base station 804 may correspond to base station 310 and the UE 802 may correspond to UE 350. Optional aspects are illustrated with a dashed line.

At 808, the RIS 806 may transmit a cluster configuration of an RIS. The cluster configuration of the RIS may comprise a plurality of clusters. The UE 802 or the base station 804 may receive the cluster configuration from an RIS controller of the RIS. In some aspects, the cluster configuration may further comprise activation of a random selection of one or more clusters based on a first probability p1. Activation of one or more active elements within a respective one of the random selection of the one or more clusters may be based on a second probability p2. In some aspects, the cluster configuration may indicate an amount of reference signals to perform a beam training procedure based at least on a number of active elements within each cluster.

In some instances, for example at 810, each cluster of the plurality of clusters of the RIS may comprise a plurality of active elements, such that the RIS controller may apply a weight to each of the plurality of active elements of each cluster. In some aspects, the weight may comprise a phase and/or a phase and an amplitude, wherein the RIS controller may apply a certain voltage to each element to achieve a certain amplitude and/or phase that may be applied to the incident signal (e.g., wave).

At 812, the UE 802, or at 814, the base station 804, may perform a beam training procedure on the plurality of clusters of the RIS. The beam training procedure 812, 814 may include the transmission of a sequence of a plurality of reference signals to each cluster of the plurality of clusters. The sequence of the plurality of reference signals may be transmitted to each cluster individually in a sequential order, such that each cluster is configured to receive the plurality of reference signals individually. The UE or base station may receive the plurality of reference signals from the RIS controller for each cluster of the plurality of clusters. The UE or base station may receive the plurality of reference signals from the RIS in response to initiation of the beam training procedure where the UE or base station transmits a plurality of reference signals to the RIS, and the RIS responds by transmitting the plurality of reference signals to the UE or base station. In some aspects, each cluster of the plurality of clusters may comprise a plurality of active elements. A weight may be applied to each of the plurality of active elements of each cluster. In some aspects, a number or an amount of clusters within the plurality of clusters of the RIS may be adjusted based on at least one of a link between the UE/base station and the RIS, an application type, a bandwidth part, component carriers, frequency band and range, or a combination thereof.

In some aspects, the beam training procedure may comprise the transmission of K reference signals. The RIS controller may activate one cluster at a time for the beam training procedure. For example, if the RIS comprises L clusters, then the beam training procedure will occur L times. The beam training procedure may comprise K reference signals or reference signal occasions to train a first cluster, then another K reference signals to train a second cluster, until all L clusters have experienced the beam training procedure. For each of the L times that the beam training procedure is performed, there are K reference signals or training occasions to determine the best or optimal beam while using the specific cluster. In some aspects, for example in downlink transmission, the UE may send an index with the best or optimal beam for each cluster. In some aspects, the UE may report an index of the best or optimal reference signal occasion, which may provide a feedback indication of an optimal configuration for each cluster of the plurality of clusters. At the end of the L beam training procedures, the UE may also transmit an index of the best set or group of clusters out of the plurality of clusters, as well as the best beams within the K reference signals with the best index for the best set or group of clusters. In some aspects, the UE may report an index of the best or optimal beam within the set of K reference signals, as well as information related to soft information (e.g., soft energy, SINR, rate, RSRP, RSRQ). In some aspects, the best or optimal cluster may be determined based on existing soft information.

In some instances, for example at 816, the UE 802 may select the set or group of clusters of the plurality of clusters. In some instances, for example at 820, the base station 804 may select the set or group of clusters of the plurality of clusters. In some aspects, the set or group of clusters may be selected based on at least one of signal strength, signal to noise ratio (SNR), signal to interference plus noise ratio (SINR), modulation and coding scheme (MCS), channel quality indicator (CQI), reference signal received power (RSRP), reference signal received quality (RSRQ), or a combination thereof.

In some instances, for example at 818, the UE 802 may perform a second beam training procedure. The UE may perform the second beam training procedure on the selected set or group of clusters. The UE may perform the second beam training procedure on the selected set or group of clusters using a sequence of reference signals. In some aspects, the UE may transmit an increased the amount of reference signals to the selected set or group of clusters in order to obtain an improved weight for the selected set or group of clusters.

In some instances, for example at 822, the base station 804 may perform a second beam training procedure. The base station may perform the second beam training procedure on the selected set or group of clusters of the RIS. The base station may perform the second beam training procedure on the selected set or group of clusters by using a sequence of reference signals. In some aspects, the second beam training procedure may include transmitting a sequence of reference signals to the selected set or group of clusters of the RIS. In some aspects, the sequence of reference signals may include a greater number of reference signals than used in the beam training procedure on the plurality of clusters of the RIS. The increased amount of reference signals in the second beam training procedure may allow for the base station to refine or improve the weights for the active elements of the selected set or group of clusters.

In some instances, at 824, the UE 802 may transmit a feedback indication indicating an optimal configuration for each cluster of the plurality of clusters. The UE may transmit the feedback indication indicating the optimal configuration for each cluster of the plurality of clusters to the base station 804. The base station 804 may receive the feedback indication from the UE 802. The UE may transmit the feedback indication indicating the optimal configuration for each cluster based at least on the beam training procedure. In some aspects, the UE may also transmit the feedback indication indicating the optimal configuration for each cluster to the RIS. In some aspects, the UE may report an index of In some instances, the UE 802 at 826 or the base station 804 at 828, may transmit an indication of at least one selected set or group of clusters of the plurality of clusters. The UE or base station may transmit the indication of the at least one selected set or group of clusters based at least on the beam training procedure. In some aspects, the at least one selected set or group of clusters of the plurality of clusters may be configured via RRC, MAC-CE, or DCI. The UE or base station may transmit the indication of the at least one selected set or group of clusters to at least one of the base station or the RIS, or both. The RIS may receive the indication of the at least one selected set or group of clusters. In some instances, the UE may transmit the indication of the at least one selected set or group of clusters to the base station. The indication of the at least one selected set or group of clusters may indicate multiple clusters as the selected set or group of clusters out of the plurality of clusters.

The base station 804 at 830, may transmit a downlink signal for reflection to a UE. The base station may transmit the downlink signal to the selected set or group of clusters of the RIS for reflection to the UE, such that the selected set or group of clusters of the RIS reflects the downlink signal from the base station to the UE. In some aspects, the selected set or group of clusters of the plurality of clusters may be activated for a period of time. Reflection of the downlink signal from the base station to the UE may occur during the period of time that the selected set or group of clusters is activated.

The RIS 806, at 832, may reflect a signal using the selected set or group of clusters of the plurality of clusters. The RIS may reflect the signal from the base station to the UE using the selected set or group of clusters. In some aspects, the selected set or group of clusters of the plurality of clusters may be activated for a period of time. In some aspects, the RIS 806 may reflect a signal from the UE to the base station.

In some instances, the UE 802 at 834 or the base station 804 at 836, if two or more clusters of the plurality of clusters are configured to be simultaneously activated, the UE or base station may perform another beam training procedure on the two or more clusters that are simultaneously activated. The UE or base station may transmit a sequence of reference signals to the two or more clusters that are configured to be simultaneously activated. For example, the UE or base station may transmit the sequence of reference signals to each of the two or more clusters individually or at the same time to further refine the weights for each of the two or more clusters. The UE or base station may receive the plurality of reference signals in response to the another beam training procedure corresponding to each of two or more clusters of the plurality of clusters. The UE or base station may receive the second plurality of reference signals in instances where two or more clusters of the plurality of clusters are simultaneously activated, such that multiple clusters are activated at the RIS to simultaneously. The updated or refined weights may assist the RIS in optimizing the use of the simultaneously activated two or more clusters.

FIG. 9 is a flowchart 900 of a method of wireless communication. The method may be performed by a UE or a component of a UE (e.g., the UE 104, 404a, 404b, 504, 604, 802; the apparatus 1102; the cellular baseband processor 1104, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a UE to train a cluster of active elements of a plurality of clusters for an RIS.

At 902, the UE may receive a cluster configuration of an RIS. For example, 902 may be performed by configuration component 1140 of apparatus 1102. The cluster configuration of the RIS may comprise a plurality of clusters. The UE may receive the cluster configuration from an RIS controller of the RIS. In some aspects, the cluster configuration may further comprise activation of a random selection of one or more clusters based on a first probability p1. Activation of one or more active elements within a respective one of the random selection of the one or more clusters may be based on a second probability p2. In some aspects, the cluster configuration may indicate an amount of reference signals to perform a beam training procedure based at least on a number of active elements within each cluster.

At 904, the UE may perform a beam training procedure on the plurality of clusters of the RIS. For example, 904 may be performed by beam training component 1142 of apparatus 1102. The beam training procedure may include the transmission of a sequence of a plurality of reference signals to each cluster of the plurality of clusters. The sequence of the plurality of reference signals may be transmitted to each cluster individually in a sequential order, such that each cluster is configured to receive the plurality of reference signals individually. The UE may receive the plurality of reference signals from the RIS controller for each cluster of the plurality of clusters. The UE may receive the plurality of reference signals from the RIS in response to initiation of the beam training procedure where the UE transmits a plurality of reference signals to the RIS, and the RIS responds by transmitting the plurality of reference signals to the UE. In some aspects, each cluster of the plurality of clusters may comprise a plurality of active elements. A weight may be applied to each of the plurality of active elements of each cluster. In some aspects, a number or an amount of clusters within the plurality of clusters of the RIS may be adjusted based on at least one of a link between the UE and the RIS, an application type, a bandwidth part, component carriers, frequency band and range, or a combination thereof.

In some aspects, the beam training procedure may comprise the transmission of K reference signals. The RIS controller may activate one cluster at a time for the beam training procedure. For example, if the RIS comprises L clusters, then the beam training procedure will occur L times. The beam training procedure may comprise K reference signals or reference signal occasions to train a first cluster, then another K reference signals to train a second cluster, until all L clusters have experienced the beam training procedure. For each of the L times that the beam training procedure is performed, there are K reference signals or training occasions to determine the best or optimal beam while using the specific cluster. In some aspects, for example in downlink transmission, the UE may send an index with the best or optimal beam for each cluster. In some aspects, the UE may report an index of the best or optimal reference signal occasion, which may provide a feedback indication of an optimal configuration for each cluster of the plurality of clusters. At the end of the L beam training procedures, the UE may also transmit an index of the best set or group of clusters out of the plurality of clusters, as well as the best beams within the K reference signals with the best index for the best set or group of clusters. In some aspects, the UE may report an index of the best or optimal beam within the set of K reference signals, as well as information related to soft information (e.g., soft energy, SINR, rate, RSRP, RSRQ). In some aspects, the best or optimal cluster may be determined based on existing soft information.

At 906, the UE may transmit a feedback indication indicating an optimal configuration for each cluster of the plurality of clusters. For example, 906 may be performed by indication component 1146 of apparatus 1102. The UE may transmit the feedback indication indicating the optimal configuration for each cluster of the plurality of clusters to the base station. The UE may transmit the feedback indication indicating the optimal configuration for each cluster based at least on the beam training procedure. In some aspects, the UE may also transmit the feedback indication indicating the optimal configuration for each cluster to the RIS.

At 908, the UE may receive a downlink signal reflected by the set or group of clusters of the RIS. For example, 908 may be performed by signal component 1150 of apparatus 1102. The UE may receive the downlink signal reflected by the set or group of clusters of the RIS from the base station. In some aspects, the set or group of clusters of the plurality of clusters may be activated for a period of time. For example, the set or group of clusters may be activated to allow for the signal to be reflected by the set or group of clusters. In some aspects, the feedback indication may inform the base station and/or the RIS of the optimal configuration based on the beam training procedure. In some aspects, the UE may also indicate the at least one set or group of clusters of the plurality of clusters of the RIS, such that the RIS may utilize the set or group of clusters to reflect the downlink signal from the base station to the UE.

FIG. 10 is a flowchart 1000 of a method of wireless communication. The method may be performed by a UE or a component of a UE (e.g., the UE 104, 404a, 404b, 504, 604, 802; the apparatus 1102; the cellular baseband processor 1104, which may include the memory 360 and which may be the entire UE 350 or a component of the UE 350, such as the TX processor 368, the RX processor 356, and/or the controller/processor 359). One or more of the illustrated operations may be optional, omitted, transposed, or contemporaneous. The method may allow a UE to train a cluster of active elements of a plurality of clusters for an RIS.

At 1002, the UE may receive a cluster configuration of an RIS. For example, 1002 may be performed by configuration component 1140 of apparatus 1102. The cluster configuration of the RIS may comprise a plurality of clusters. The UE may receive the cluster configuration from an RIS controller of the RIS. In some aspects, the cluster configuration may further comprise activation of a random selection of one or more clusters based on a first probability p1. Activation of one or more active elements within a respective one of the random selection of the one or more clusters may be based on a second probability p2. In some aspects, the cluster configuration may indicate an amount of reference signals to perform a beam training procedure based at least on a number of active elements within each cluster.

At 1004, the UE may perform a beam training procedure on the plurality of clusters of the RIS. For example, 1004 may be performed by beam training component 1142 of apparatus 1102. The beam training procedure may include the transmission of a sequence of a plurality of reference signals to each cluster of the plurality of clusters. The sequence of the plurality of reference signals may be transmitted to each cluster individually in a sequential order, such that each cluster is configured to receive the plurality of reference signals individually. The UE may receive the plurality of reference signals from the RIS controller for each cluster of the plurality of clusters. The UE may receive the plurality of reference signals from the RIS in response to initiation of the beam training procedure where the UE transmits a plurality of reference signals to the RIS, and the RIS responds by transmitting the plurality of reference signals to the UE. In some aspects, each cluster of the plurality of clusters may comprise a plurality of active elements. A weight may be applied to each of the plurality of active elements of each cluster. In some aspects, a number or an amount of clusters within the plurality of clusters of the RIS may be adjusted based on at least one of a link between the UE and the RIS, an application type, a bandwidth part, component carriers, frequency band and range, or a combination thereof.

In some aspects, the beam training procedure may comprise the transmission of K reference signals. The RIS controller may activate one cluster at a time for the beam training procedure. For example, if the RIS comprises L clusters, then the beam training procedure will occur L times. The beam training procedure may comprise K reference signals or reference signal occasions to train a first cluster, then another K reference signals to train a second cluster, until all L clusters have experienced the beam training procedure. For each of the L times that the beam training procedure is performed, there are K reference signals or training occasions to determine the best or optimal beam while using the specific cluster. In some aspects, for example in downlink transmission, the UE may send an index with the best or optimal beam for each cluster. In some aspects, the UE may report an index of the best or optimal reference signal occasion, which may provide a feedback indication of an optimal configuration for each cluster of the plurality of clusters. At the end of the L beam training procedures, the UE may also transmit an index of the best set or group of clusters out of the plurality of clusters, as well as the best beams within the K reference signals with the best index for the best set or group of clusters. In some aspects, the UE may report an index of the best or optimal beam within the set of K reference signals, as well as information related to soft information (e.g., soft energy, SINR, rate, RSRP, RSRQ). In some aspects, the best or optimal cluster may be determined based on existing soft information.

In some aspects, for example at 1006, the UE may select the set or group of clusters of the plurality of clusters. For example, 1006 may be performed by selection component 1144 of apparatus 1102. In some aspects, the set or group of clusters may be selected based on at least one of signal strength, signal to noise ratio (SNR), signal to interference plus noise ratio (SINR), modulation and coding scheme (MCS), channel quality indicator (CQI), reference signal received power (RSRP), reference signal received quality (RSRQ), or a combination thereof.

In some aspects, for example at 1008, the UE may perform a second beam training procedure. For example, 1008 may be performed by beam training component 1146 of apparatus 1102. The UE may perform the second beam training procedure on the selected set or group of clusters. The UE may perform the second beam training procedure on the selected set or group of clusters using a sequence of reference signals. In some aspects, the UE may transmit an increased amount of reference signals to the selected set or group of clusters in order to obtain an improved weight for the selected set or group of clusters.

In some aspects, for example at 1010, the UE may transmit an indication of at least one selected set or group of clusters of the plurality of clusters. For example, 1010 may be performed by indication component 1146 of apparatus 1102. The UE may transmit the indication of the at least one selected set or group of clusters based at least on the beam training procedure. In some aspects, the at least one selected set or group of clusters of the plurality of clusters may be configured via RRC, MAC-CE, or DCI. The UE may transmit the indication of the at least one selected set or group of clusters to at least one of the base station or the RIS, or both. The indication of the at least one selected set or group of clusters may indicate multiple clusters as the selected set or group of clusters out of the plurality of clusters.

At 1012, the UE may transmit a feedback indication indicating an optimal configuration for each cluster of the plurality of clusters. For example, 1012 may be performed by indication component 1146 of apparatus 1102. The UE may transmit the feedback indication indicating the optimal configuration for each cluster of the plurality of clusters to the base station. The UE may transmit the feedback indication indicating the optimal configuration for each cluster based at least on the beam training procedure. In some aspects, the UE may also transmit the feedback indication indicating the optimal configuration for each cluster to the RIS.

At 1014, the UE may receive a downlink signal reflected by the set or group of clusters of the RIS. For example, 1014 may be performed by signal component 1150 of apparatus 1102. The UE may receive the downlink signal reflected by the set or group of clusters of the RIS from the base station. In some aspects, the set or group of clusters of the plurality of clusters may be activated for a period of time. For example, the set or group of clusters may be activated to allow for the signal to be reflected by the set or group of clusters. In some aspects, the feedback indication may inform the base station and/or the RIS of the optimal configuration based on the beam training procedure. In some aspects, the UE may also indicate the at least one set or group of clusters of the plurality of clusters of the RIS, such that the RIS may utilize the set or group of clusters to reflect the downlink signal from the base station to the UE.

In some aspects, for example at 1016, if two or more clusters of the plurality of clusters are configured to be simultaneously activated, the UE may perform another beam training procedure on the two or more clusters that are simultaneously activated. For example, 1016 may be performed by beam training component 1142 of apparatus 1102. The UE may transmit a sequence of reference signals to the two or more clusters that are configured to be simultaneously activated. For example, the UE may transmit the sequence of reference signals to each of the two or more clusters individually or at the same time to further refine the weights for each of the two or more clusters. The UE may receive the plurality of reference signals in response to the another beam training procedure corresponding to each of two or more clusters of the plurality of clusters. The UE may receive the second plurality of reference signals in instances where two or more clusters of the plurality of clusters are simultaneously activated, such that multiple clusters are activated at the RIS to simultaneously. The updated or refined weights may assist the RIS in optimizing the use of the simultaneously activated two or more clusters.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1132 includes a configuration component 1140 that is configured to receive a cluster configuration of an RIS, e.g., as described in connection with 902 of FIG. 9 or 1002 of FIG. 10. The communication manager 1132 further includes a beam training component 1142 that is configured to perform a beam training procedure on the plurality of clusters of the RIS, e.g., as described in connection with 904 of FIG. 9 or 1004 of FIG. 10. The beam training component 1142 may be further configured to performing a second beam training procedure on the selected set or group of clusters, e.g., as described in connection with 1008 of FIG. 10. The beam training component 1142 may be further configured to receive a second plurality of reference signals corresponding to each of two or more clusters, e.g., as described in connection with 1016 of FIG. 10. The communication manager 1132 further includes a selection component 1144 that is configured to select a set or group of clusters of the plurality of clusters, e.g., as described in connection with 1006 of FIG. 10. The communication manager 1132 further includes an indication component 1146 that is configured to transmit an indication of at least one selected set or group of clusters of the plurality of clusters, e.g., as described in connection with 1010 of FIG. 10. The indication component 1046 may be further configured to transmit a feedback indication indicating an optimal configuration for each cluster of the plurality of clusters, e.g., as described in connection with 906 of FIG. 9 or 1012 of FIG. 10. The communication manager 1132 further includes a signal component 1150 that is configured to receive a downlink signal reflected by the set or group of clusters of the RIS, e.g., as described in connection with 908 of FIG. 9 or 1014 of FIG. 10.

The apparatus may include additional components that perform each of the blocks of the algorithm in the aforementioned flowcharts of FIG. 9 or 10. As such, each block in the aforementioned flowcharts of FIG. 9 or 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the cellular baseband processor 1104, includes means for receiving, from an RIS controller, a cluster configuration of a RIS comprising a plurality of clusters. The apparatus includes means for performing a beam training procedure on the plurality of clusters of the RIS. The beam training procedure including transmission of a sequence of a plurality of reference signals to each cluster of the plurality of clusters. The apparatus includes means for transmitting, to a base station, a feedback indication indicating an optimal configuration for each cluster of the plurality of clusters based at least on the beam training procedure. The apparatus includes means for receiving a downlink signal reflected by the set or group of clusters of the RIS from the base station. The apparatus further includes means for selecting the set or group of clusters of the plurality of clusters. The apparatus further includes means for performing a second beam training procedure on the selected set or group of clusters using a sequence of reference signals. The apparatus further includes means for receiving, from the RIS controller, a second plurality of reference signals corresponding to each of the two or more clusters of the plurality of clusters. The second plurality of reference signals further refine corresponding weights of each of the two or more clusters of the plurality of clusters. The apparatus further includes means for transmitting an indication of at least one selected set or group of clusters of the plurality of clusters based at least on the beam training procedure. The at least one selected set or group of clusters of the plurality of clusters is configured via RRC, MAC-CE, or DCI. The aforementioned means may be one or more of the aforementioned components of the apparatus 1002 configured to perform the functions recited by the aforementioned means. As described supra, the apparatus 1102 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 12 is a flowchart 1200 of a method of wireless communication. The method may be performed by a base station or a component of a base station (e.g., the base station 102/180, 402, 502, 602, 804; the apparatus 1402; the baseband unit 1404, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a base station to train a cluster of active elements of a plurality of clusters for an RIS.

At 1202, the base station may receive a cluster configuration of an RIS. For example, 1202 may be performed by configuration component 1440 of apparatus 1402. The cluster configuration of the RIS may comprise a plurality of clusters. The base station may receive the cluster configuration from an RIS controller of the RIS. In some aspects, the cluster configuration may further comprise activation of a random selection of one or more clusters based on a first probability p1. Activation of one or more active elements within a respective one of the random selection of the one or more clusters may be based on a second probability p2. In some aspects, the cluster configuration may indicate an amount of reference signals to perform a beam training procedure based at least on a number of active elements within each cluster.

At 1204, the base station may perform a beam training procedure on the plurality of clusters of the RIS. For example, 1204 may be performed by beam training component 1442 of apparatus 1402. The beam training procedure may include the transmission of a sequence of a plurality of reference signals to each cluster of the plurality of clusters. The sequence of the plurality of reference signals may be transmitted to each cluster individually in a sequential order, such that each cluster is configured to receive the plurality of reference signals individually. The base station may receive the plurality of reference signals from the RIS controller for each cluster of the plurality of clusters. The base station may receive the plurality of reference signals from the RIS in response to initiation of the beam training procedure where the base station transmits a plurality of reference signals to the RIS, and the RIS responds by transmitting the plurality of reference signals to the base station. In some aspects, each cluster of the plurality of clusters may comprise a plurality of active elements. A weight may be applied to each of the plurality of active elements of each cluster. In some aspects, a number or an amount of clusters within the plurality of clusters of the RIS may be adjusted based on at least one of a link between the base station and the RIS, an application type, a bandwidth part, component carriers, frequency band and range, or a combination thereof.

At 1206, the base station may select a set or group of clusters of the plurality of clusters of the RIS. For example, 1206 may be performed by selection component 1444 of apparatus 1402. The base station may select the set or group of clusters of the plurality of clusters of the RIS based at least one the beam training procedure. In some aspects, the set or group of clusters may be selected based on at least one of signal strength, SNR, SINR, MCS, CQI, RSRP, RSRQ, or a combination thereof. In some aspects, to select the set or group of clusters, the base station may receive a feedback indication from the UE indicating an optimal configuration for each cluster of the plurality of clusters. The base station may select the set or group of clusters based on the feedback indication from the UE. In some aspects, the base station may determine the set or group of clusters to select based on measurements of the plurality of reference signal of the beam training procedure.

At 1208, the base station may transmit a downlink signal for reflection to a UE. For example, 1208 may be performed by signal component 1446 of apparatus 1402. The base station may transmit the downlink signal to the selected set or group of clusters of the RIS for reflection to the UE, such that the selected set or group of clusters of the RIS reflects the downlink signal form the base station to the UE. In some aspects, the selected set or group of clusters of the plurality of clusters may be activated for a period of time. Reflection of the downlink signal from the base station to the UE may occur during the period of time that the selected set or group of clusters are activated.

FIG. 13 is a flowchart 1300 of a method of wireless communication. The method may be performed by a base station or a component of a base station (e.g., the base station 102/180, 402, 502, 602, 804; the apparatus 1402; the baseband unit 1404, which may include the memory 376 and which may be the entire base station 310 or a component of the base station 310, such as the TX processor 316, the RX processor 370, and/or the controller/processor 375). One or more of the illustrated operations may be optional, omitted, transposed, or contemporaneous. The method may allow a base station to train a cluster of active elements of a plurality of clusters for an RIS.

At 1302, the base station may receive a cluster configuration of an RIS. For example, 1302 may be performed by configuration component 1440 of apparatus 1402. The cluster configuration of the RIS may comprise a plurality of clusters. The base station may receive the cluster configuration from an RIS controller of the RIS. In some aspects, the cluster configuration may further comprise activation of a random selection of one or more clusters based on a first probability p1. Activation of one or more active elements within a respective one of the random selection of the one or more clusters may be based on a second probability p2. In some aspects, the cluster configuration may indicate an amount of reference signals to perform a beam training procedure based at least on a number of active elements within each cluster.

At 1304, the base station may perform a beam training procedure on the plurality of clusters of the RIS. For example, 1304 may be performed by beam training component 1442 of apparatus 1402. The beam training procedure may include the transmission of a sequence of a plurality of reference signals to each cluster of the plurality of clusters. The sequence of the plurality of reference signals may be transmitted to each cluster individually in a sequential order, such that each cluster is configured to receive the plurality of reference signals individually. The base station may receive the plurality of reference signals from the RIS controller for each cluster of the plurality of clusters. The base station may receive the plurality of reference signals from the RIS in response to initiation of the beam training procedure where the base station transmits a plurality of reference signals to the RIS, and the RIS responds by transmitting the plurality of reference signals to the base station. In some aspects, each cluster of the plurality of clusters may comprise a plurality of active elements. A weight may be applied to each of the plurality of active elements of each cluster. In some aspects, a number or an amount of clusters within the plurality of clusters of the RIS may be adjusted based on at least one of a link between the base station and the RIS, an application type, a bandwidth part, component carriers, frequency band and range, or a combination thereof.

At 1306, the base station may select a set or group of clusters of the plurality of clusters of the RIS. For example, 1306 may be performed by selection component 1444 of apparatus 1402. The base station may select the set or group of clusters of the plurality of clusters of the RIS based at least one the beam training procedure. In some aspects, the set or group of clusters may be selected based on at least one of signal strength, SNR, SINR, MCS, CQI, RSRP, RSRQ, or a combination thereof. In some aspects, to select the set or group of clusters, the base station may receive a feedback indication from the UE indicating an optimal configuration for each cluster of the plurality of clusters. The base station may select the set or group of clusters based on the feedback indication from the UE. In some aspects, the base station may determine the set or group of clusters to select based on measurements of the plurality of reference signal of the beam training procedure.

In some aspects, for example at 1308, the base station may perform a second beam training procedure. For example, 1308 may be performed by beam training component 1442 of apparatus 1402. The base station may perform the second beam training procedure on the selected set or group of clusters of the RIS. The base station may perform the second beam training procedure on the selected set or group of clusters by using a sequence of reference signals. In some aspects, the second beam training procedure may include transmitting a sequence of reference signals to the selected set or group of clusters of the RIS. In some aspects, the sequence of reference signals may include a greater number of reference signals than used in the beam training procedure on the plurality of clusters of the RIS. The increased amount of reference signals in the second beam training procedure may allow for the base station to refine or improve the weights for the active elements of the selected set or group of clusters.

At 1310, the base station may transmit a downlink signal for reflection to a UE. For example, 1310 may be performed by signal component 1446 of apparatus 1402. The base station may transmit the downlink signal to the selected set or group of clusters of the RIS for reflection to the UE, such that the selected set or group of clusters of the RIS reflects the downlink signal form the base station to the UE. In some aspects, the selected set or group of clusters of the plurality of clusters may be activated for a period of time. Reflection of the downlink signal from the base station to the UE may occur during the period of time that the selected set or group of clusters are activated.

In some aspects, for example at 1312, if two or more clusters of the plurality of clusters are configured to be simultaneously activated, the base station may perform another beam training procedure on the two or more clusters that are simultaneously activated. For example, 1312 may be performed by beam training component 1442 of apparatus 1402. The base station may transmit a sequence of reference signals to the two or more clusters that are configured to be simultaneously activated. For example, the base station may transmit the sequence of reference signals to each of the two or more clusters individually or at the same time to further refine the weights for each of the two or more clusters. The base station may receive the plurality of reference signals in response to the another beam training procedure corresponding to each of two or more clusters of the plurality of clusters. The base station may receive the second plurality of reference signals in instances where two or more clusters of the plurality of clusters are simultaneously activated, such that multiple clusters are activated at the RIS to simultaneously. The updated or refined weights may assist the RIS in optimizing the use of the simultaneously activated two or more clusters.

Figure 14:
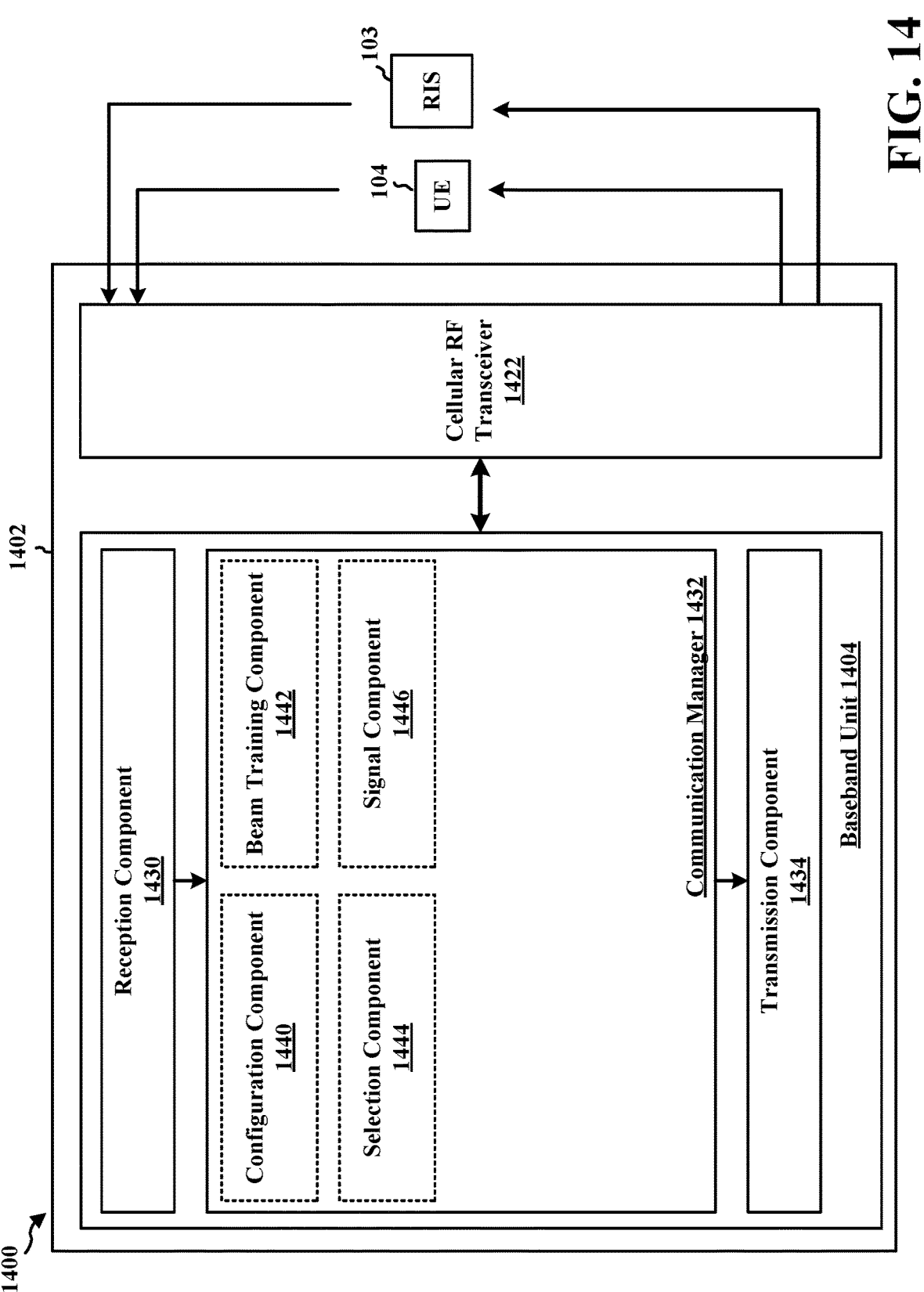
FIG. 14 is a diagram illustrating an example of a hardware implementation for an example apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 310 and may include the memory 376 and/or at least one of the TX processor 316, the RX processor 370, and the controller/processor 375.

The communication manager 1432 includes a configuration component 1440 that may receive a cluster configuration of an RIS, e.g., as described in connection with 1202 of FIG. 12 or 1302 of FIG. 13. The communication manager 1432 further includes a beam training component 1442 that may perform a beam training procedure on the plurality of clusters of the RIS, e.g., as described in connection with 1204 of FIG. 12 or 1304 of FIG. 13. The beam training component 1442 may be further configured to perform a second beam training procedure, e.g., as described in connection with 1308 of FIG. 13. The beam training component 1442 may be further configured to perform another beam training procedure on the two or more clusters that are simultaneously activated, e.g., as described in connection with 1312 of FIG. 13. The communication manager 1432 further includes a selection component 1444 that may select a set or group of clusters of the plurality of clusters of the RIS, e.g., as described in connection with 1206 of FIG. 12 or 1306 of FIG. 13. The communication manager 1432 further includes a signal component 1446 that may transmit a downlink signal for reflection to a UE, e.g., as described in connection with 1208 of FIG. 12 or 1310 of FIG. 13.

The apparatus may include additional components that perform each of the blocks of the algorithm in the aforementioned flowcharts of FIG. 12 or 13. As such, each block in the aforementioned flowcharts of FIG. 12 or 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for receiving, from an RIS controller, a cluster configuration of the RIS comprising a plurality of clusters. The apparatus includes means for performing a beam training procedure on the plurality of clusters of the RIS. The beam training procedure including transmission of a sequence of a plurality of reference signals to each cluster of the plurality of clusters. The apparatus includes means for selecting a set or group of clusters of the plurality of clusters of the RIS based at least on the beam training procedure. The apparatus includes means for transmitting, to the selected set or group of clusters of the RIS, a downlink signal for reflection to a UE. The apparatus further includes means for performing a second beam training procedure on the selected set or group of clusters using a sequence of reference signals. The apparatus further includes means for receiving a feedback indication from a UE indicating an optimal configuration for each cluster of the plurality of clusters. The apparatus further includes means for determining the set or group of clusters based on measurements of the plurality of reference signals of the beam training procedure. The apparatus further includes means for receiving, from the RIS controller, a second plurality of reference signals corresponding to each of the two or more clusters of the plurality of clusters. The second plurality of reference signals further refine a corresponding weighted index of each of the two or more clusters of the plurality of clusters. The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

FIG. 15 is a flowchart 1500 of a method of wireless communication. The method may be performed by an RIS (e.g., the RIS 103, 406, 506, 606, 706, 806; the apparatus 1702; the controller processing unit 1404). One or more of the illustrated operations may be optional, omitted, transposed, or contemporaneous. The method may allow for a plurality of clusters of an RIS to be trained by a base station or a UE.

At 1502, the RIS may transmit a cluster configuration of the RIS comprising a plurality of clusters. For example, 1502 may be performed by configuration component 1740 of apparatus 1702. The cluster configuration of the RIS may comprise a plurality of clusters. The RIS may transmit the cluster configuration from an RIS controller of the RIS. The RIS may transmit the cluster configuration to a UE or a base station. In some aspects, the cluster configuration may further comprise activation of a random selection of one or more clusters based on a first probability p1. Activation of one or more active elements within a respective one of the random selection of the one or more clusters may be based on a second probability p2. In some aspects, the cluster configuration may indicate an amount of reference signals to perform a beam training procedure based at least on a number of active elements within each cluster.

At 1504, the RIS may receive a sequence of a plurality of reference signals as part of a beam training procedure. For example, 1504 may be performed by beam training component 1742 of apparatus 1702. The RIS may receive the sequence of the plurality of reference signals of the beam training procedure from a base station or a UE. The RIS may receive the sequence of the plurality of reference signals of the beam training procedure at each cluster of the plurality of clusters. The sequence of the plurality of reference signals may be received at each cluster individually in a sequential order, such that each cluster is configured to receive the plurality of reference signals individually. The RIS may transmit a plurality of reference signals from the RIS controller for each cluster of the plurality of clusters, in response to receive the plurality of reference signals. The RIS may transmit the plurality of reference signals to the UE or base station in response to initiation of the beam training procedure where the UE or base station transmits a plurality of reference signals to the RIS, and the RIS responds by transmitting the plurality of reference signals to the UE or base station. In some aspects, each cluster of the plurality of clusters may be activated individually to receive the sequence of the plurality of reference signals as part of the beam training procedure. In some aspects, a cluster of the plurality of clusters may be activated based on a probability Pk and a binary vector. In some aspects, a number or an amount of clusters within the plurality of clusters of the RIS may be adjusted based on a link type, an application type, a bandwidth part, component carriers, frequency band and range, or a combination thereof.

At 1506, the RIS may receive an indication indicating a selected set or group of clusters of the plurality of clusters. For example, 1508 may be performed by indication component 1746 of apparatus 1702. The RIS may receive the indication indicating the selected set or group of clusters of the plurality of clusters from the base station or the UE. In some aspects, the set or group of clusters may be selected based on at least one of signal strength, SNR, SINR, MCS, CQI, RSRP, RSRQ, or a combination thereof.

At 1508, the RIS may reflect a signal using the selected set or group of clusters of the plurality of clusters. For example, 1512 may be performed by reflect component 1748 of apparatus 1702. The RIS may reflect a signal from the base station or the UE using the selected set or group of clusters. In some aspects, the selected set or group of clusters of the plurality of clusters is activated for a period of time.

FIG. 16 is a flowchart 1600 of a method of wireless communication. The method may be performed by an RIS (e.g., the RIS 103, 406, 506, 606, 706, 806; the apparatus 1402; the controller processing unit 1404). One or more of the illustrated operations may be optional, omitted, transposed, or contemporaneous. The method may allow for a plurality of clusters of an RIS to be trained by a base station or a UE.

At 1602, the RIS may transmit a cluster configuration of the RIS comprising a plurality of clusters. For example, 1602 may be performed by configuration component 1440 of apparatus 1402. The cluster configuration of the RIS may comprise a plurality of clusters. The RIS may transmit the cluster configuration from an RIS controller of the RIS. The RIS may transmit the cluster configuration to a UE or a base station. In some aspects, the cluster configuration may further comprise activation of a random selection of one or more clusters based on a first probability p1. Activation of one or more active elements within a respective one of the random selection of the one or more clusters may be based on a second probability p2. In some aspects, the cluster configuration may indicate an amount of reference signals to perform a beam training procedure based at least on a number of active elements within each cluster.

At 1604, the RIS may receive a sequence of a plurality of reference signals as part of a beam training procedure. For example, 1604 may be performed by beam training component 1442 of apparatus 1402. The RIS may receive the sequence of the plurality of reference signals of the beam training procedure from a base station or a UE. The RIS may receive the sequence of the plurality of reference signals of the beam training procedure at each cluster of the plurality of clusters. The sequence of the plurality of reference signals may be received at each cluster individually in a sequential order, such that each cluster is configured to receive the plurality of reference signals individually. The RIS may transmit a plurality of reference signals from the RIS controller for each cluster of the plurality of clusters, in response to receive the plurality of reference signals. The RIS may transmit the plurality of reference signals to the UE or base station in response to initiation of the beam training procedure where the UE or base station transmits a plurality of reference signals to the RIS, and the RIS responds by transmitting the plurality of reference signals to the UE or base station. In some aspects, each cluster of the plurality of clusters may be activated individually to receive the sequence of the plurality of reference signals as part of the beam training procedure. In some aspects, a cluster of the plurality of clusters may be activated based on a probability Pk and a binary vector. In some aspects, a number or an amount of clusters within the plurality of clusters of the RIS may be adjusted based on a link type, an application type, a bandwidth part, component carriers, frequency band and range, or a combination thereof.

In some aspects, for example at 1606, each cluster of the plurality of clusters of the RIS may comprise a plurality of active elements, such that the RIS controller may apply a weight to each of the plurality of active elements of each cluster. For example, 1606 may be performed by weight component 1444 of apparatus 1402. In some aspects, the weight may comprise a phase and/or a phase and an amplitude, wherein the RIS controller may apply a certain voltage to each element to achieve a certain amplitude and/or phase that may be applied to the incident signal (e.g., wave).

At 1608, the RIS may receive an indication indicating a selected set or group of clusters of the plurality of clusters. For example, 1608 may be performed by indication component 1446 of apparatus 1402. The RIS may receive the indication indicating the selected set or group of clusters of the plurality of clusters from the base station or the UE. In some aspects, the set or group of clusters may be selected based on at least one of signal strength, SNR, SINR, MCS, CQI, RSRP, RSRQ, or a combination thereof.

In some aspects, for example at 1610, the RIS may receive a second sequence of reference signals as part of a second beam training procedure. For example, 1610 may be performed by beam training component 1442 of apparatus 1402. The RIS may receive the second sequence of reference signals as part of the second beam training procedure to train the selected set or group of clusters. The RIS may receive the second sequence of reference signals as part of the second beam training procedure from the UE or the base station. In some aspects, the RIS may receive an increased amount of reference signals at the selected set or group of clusters in an effort to optimize or improve the weight for the selected set or group of clusters.

At 1612, the RIS may reflect a signal using the selected set or group of clusters of the plurality of clusters. For example, 1612 may be performed by reflect component 1448 of apparatus 1402. The RIS may reflect a signal from the base station or the UE using the selected set or group of clusters. In some aspects, the selected set or group of clusters of the plurality of clusters is activated for a period of time.

In some aspects, for example at 1614, if two or more clusters of the plurality of clusters are configured to be simultaneously activated, the RIS may receive an additional plurality of reference signals as part of another beam training procedure on the two or more clusters that are simultaneously activated. For example, 1614 may be performed by beam training component 1442 of apparatus 1402. The UE or base station may transmit a sequence of reference signals to the two or more clusters that are configured to be simultaneously activated. The RIS may receive the sequence of reference signals at the two or more clusters that are configured to be simultaneously activated. For example, the UE or base station may transmit the sequence of reference signals to each of the two or more clusters individually or at the same time to further refine the weights for each of the two or more clusters. The RIS, in response, may transmit the plurality of reference signals in response to the initiation of the another beam training procedure corresponding to each of two or more clusters of the plurality of clusters. The RIS may transmit the corresponding second plurality of reference signals in instances where two or more clusters of the plurality of clusters are simultaneously activated, such that multiple clusters are activated at the RIS to simultaneously.

The second plurality of reference signals of the another beam training process may further refine corresponding weights of each of the two or more clusters of the plurality of clusters. The updated or refined weights may assist the RIS in optimizing the use of the simultaneously activated two or more clusters.

Figure 17:
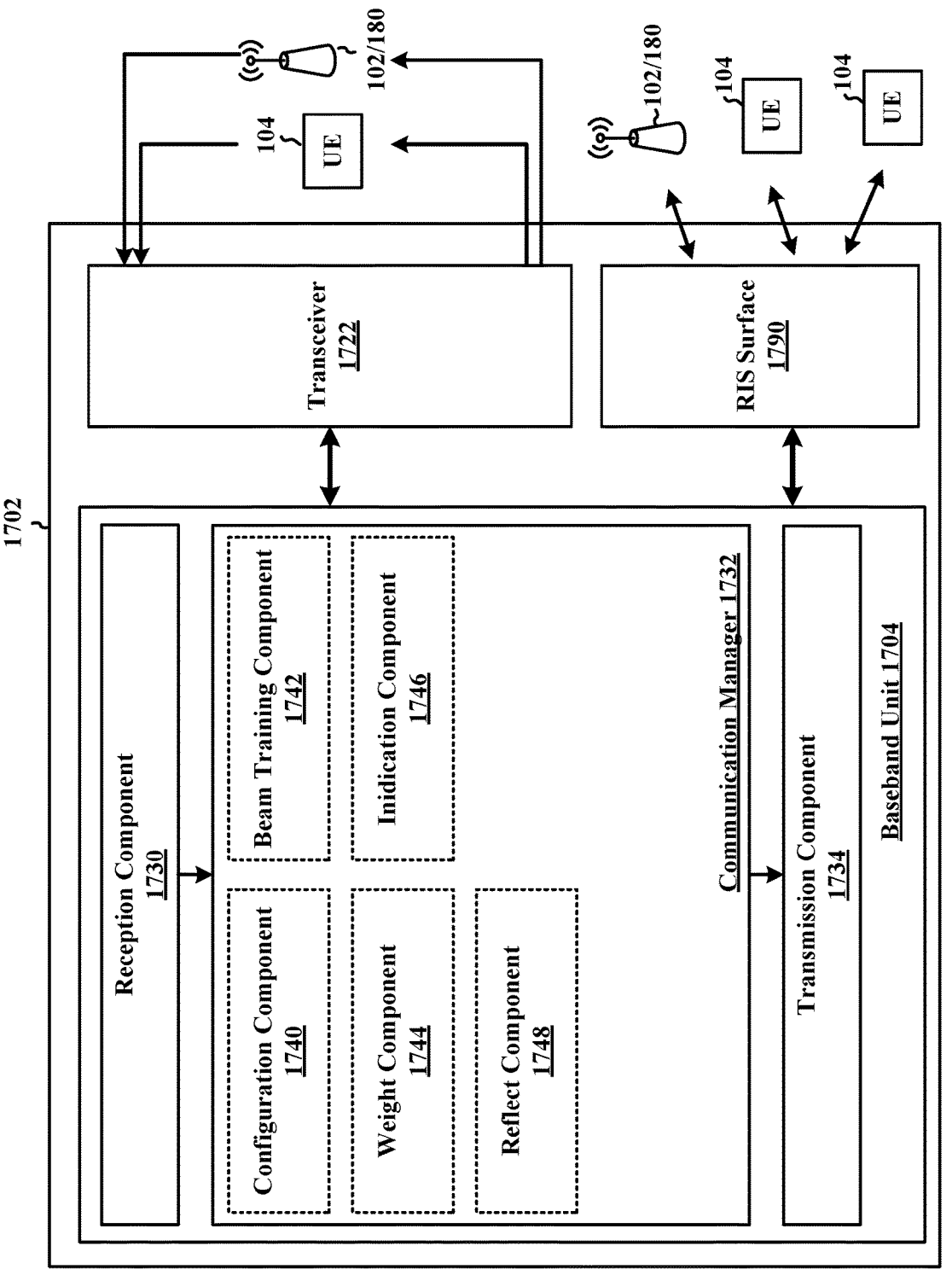
FIG. 17 is a diagram illustrating an example of a hardware implementation for an example apparatus.

FIG. 17 is a diagram 1700 illustrating an example of a hardware implementation for an apparatus 1702. The apparatus 1702 is an RIS and may include a controller processing unit 1704, e.g., as a part of a controller processor unit. The controller processing unit 1704 may communicate through a cellular RF transceiver 1722 via sidelink with the UE 104 and/or base station 102/180. The apparatus 1702 may further include an RIS surface 1790. The controller processing unit 1704 may include a computer-readable medium/memory. The controller processing unit 1704 is responsible for general processing, including the execution of software stored on the computer-readable medium/memory. The software, when executed by the controller processing unit 1704, causes the controller processing unit 1704 to perform the various functions described supra. The computer-readable medium/memory may also be used for storing data that is manipulated by the controller processing unit 1704 when executing software. The controller processing unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the controller processing unit 1704. The controller processing unit 1704 may be a component of the RIS 103 and may include the memory 376 and/or at least one of the TX processor 316, the RX processor 370, and the controller/processor 375, such as described in connection with the device 310.

The communication manager 1732 includes a configuration component 1740 that is configured to transmit a cluster configuration of the RIS comprising a plurality of clusters, e.g., as described in connection with 1502 of FIG. 15 or 1602 of FIG. 16. The communication manager 1732 further includes a beam training component 1742 that is configured to receive a sequence of a plurality of reference signals as part of a beam training procedure, e.g., as described in connection with 1504 of FIG. 15 or 1604 of FIG. 16. The beam training component 1742 may be configured to receive a second sequence of reference signals as part of a second beam training procedure, e.g., as described in connection with 1610 of FIG. 16. The beam training component 1742 may be configured to receive an additional plurality of reference signals as part of another beam training procedure on two or more clusters that are simultaneously activated, e.g., as described in connection with 1614 of FIG. 16. The communication manager 1732 further includes a weight component 1744 that is configured to apply a weight to each of the plurality of active elements of each cluster, e.g., as described in connection with 1606 of FIG. 16. The communication manager 1732 further includes an indication component 1746 that is configured to receive an indication indicating a selected set or group of clusters of the plurality of clusters, e.g., as described in connection with 1506 of FIG. 15 or 1608 of FIG. 16. The communication manager 1732 further includes a reflect component 1748 that is configured to reflect a signal using the selected set or group of clusters of the plurality of clusters, e.g., as described in connection with 1508 or FIG. 15 or 1612 of FIG. 16.

The apparatus may include additional components that perform each of the blocks of the algorithm in the aforementioned flowcharts of FIG. 15 or 16. As such, each block in the aforementioned flowcharts of FIG. 15 or 16 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the cellular baseband processor 1704, includes means for transmitting, via a RIS controller, a cluster configuration of the RIS comprising a plurality of clusters. The apparatus includes means for receiving, from a base station or a UE, a sequence of a plurality of reference signals as part of a beam training procedure at each cluster of the plurality of clusters. The apparatus includes means for receiving, from the base station or the UE, an indication indicating a selected set or group of clusters of the plurality of clusters. The apparatus includes means for reflecting a signal from the base station or the UE using the selected set or group of clusters of the plurality of clusters. The apparatus further includes means for receiving a second sequence of reference signals to train the selected set or group of clusters. The apparatus further includes means for applying a weight to each of the plurality of active elements of each cluster. The apparatus further includes means for transmitting, via the RIS controller, a second plurality of reference signals corresponding to each of the two or more clusters of the plurality of clusters. The second plurality of reference signals further refine corresponding weights of each of the two or more clusters of the plurality of clusters. The aforementioned means may be one or more of the aforementioned components of the apparatus 1702 configured to perform the functions recited by the aforementioned means. As described supra, the apparatus 1702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to receive, from an RIS controller, a cluster configuration of a RIS comprising a plurality of clusters; perform a beam training procedure on the plurality of clusters of the RIS, the beam training procedure including transmission of a sequence of a plurality of reference signals to each cluster of the plurality of clusters; transmit, to a base station, a feedback indication indicating an optimal configuration for each cluster of the plurality of clusters based at least on the beam training procedure; and receive a downlink signal reflected by a set or group of clusters of the RIS from the base station.

In Aspect 2, the apparatus of Aspect 1 further includes a transceiver coupled to the at least one processor In Aspect 3, the apparatus of Aspect 1 or 2 further configured to select the set or group of clusters of the plurality of clusters; and perform a second beam training procedure on the selected set or group of clusters using a sequence of reference signals.

In Aspect 4, the apparatus of any of Aspects 1-3 further includes that the selected set or group of clusters is based on at least one of signal strength, SNR, SINR, MCS, CQI, RSRP, RSRQ, or a combination thereof.

In Aspect 5, the apparatus of any of Aspects 1-4 further includes that each cluster of the plurality of clusters comprises a plurality of active elements, wherein a weight is applied to each of the plurality of active elements of each cluster.

In Aspect 6, the apparatus of any of Aspects 1-5 further includes that if two or more clusters of the plurality of clusters are simultaneously activated further configured to receive, from the RIS controller, a second plurality of reference signals corresponding to each of the two or more clusters of the plurality of clusters, wherein the second plurality of reference signals further refine a corresponding weighted index of each of the two or more clusters of the plurality of clusters.

In Aspect 7, the apparatus of any of Aspects 1-6 further configured to transmit an indication of at least one selected set or group of clusters of the plurality of clusters based at least on the beam training procedure, wherein the at least one selected set or group of clusters of the plurality of clusters is configured via RRC, MAC-CE, or DCI.

In Aspect 8, the apparatus of any of Aspects 1-7 further includes that a number of clusters within the plurality of clusters of the RIS is adjusted based on at least one of a link between the UE and the RIS, an application type, a bandwidth part, component carriers, frequency band and range, or a combination thereof.

In Aspect 9, the apparatus of any of Aspects 1-8 further includes that the cluster configuration further comprises activation of a random selection of one or more clusters based on a first probability p1, wherein activation of one or more active elements within a respective one of the random selection of the one or more clusters is based on a second probability p2.

In Aspect 10, the apparatus of any of Aspects 1-9 further includes that the set or group of clusters of the plurality of clusters is activated for a period of time, wherein the cluster configuration indicates an amount of reference signals to perform the beam training procedure based at least on a number of active elements within each cluster.

Aspect 11 is a method of wireless communication for implementing any of Aspects 1-10.

Aspect 12 is an apparatus for wireless communication including means for implementing a method or realizing an apparatus as in any of Aspects 1-10.

Aspect 13 is a non-transitory computer readable medium storing computer executable code, where the code executed by a processor causes the processor to implement any of Aspect 1-10.

Aspect 14 is an apparatus for wireless communication at a base station including at least one processor coupled to a memory and configured to receive, from a RIS controller, a cluster configuration of the RIS comprising a plurality of clusters; perform a beam training procedure on the plurality of clusters of the RIS, the beam training procedure including transmission of a sequence of a plurality of reference signals to each cluster of the plurality of clusters; select a set or group of clusters of the plurality of clusters of the RIS based at least on the beam training procedure; and transmit, to the selected set or group of clusters of the RIS, a downlink signal for reflection to a UE.

In Aspect 15, the apparatus of Aspect 14 further includes a transceiver coupled to the at least one processor.

In Aspect 16, the apparatus of Aspect 14 or 15 further configured to perform a second beam training procedure on the selected set or group of clusters using a sequence of reference signals.

In Aspect 17, the apparatus of any of Aspects 14-16 further includes that the selected set or group of clusters is based on at least one of signal strength, SNR, SINR, MCS, CQI, RSRP, RSRQ, or a combination thereof.

In Aspect 18, the apparatus of any of Aspects 14-17 further includes that each cluster of the plurality of clusters comprises a plurality of active elements, wherein a weight is applied to each of the plurality of active elements of each cluster.

In Aspect 19, the apparatus of any of Aspects 14-18 further includes to select the set or group of clusters further configured to receive a feedback indication from a UE indicating an optimal configuration for each cluster of the plurality of clusters, or determine the set or group of clusters based on measurements of the plurality of reference signals of the beam training procedure.

In Aspect 20, the apparatus of any of Aspects 14-19 further includes that if two or more clusters of the plurality of clusters are simultaneously activated further configured to receive, from the RIS controller, a second plurality of reference signals corresponding to each of the two or more clusters of the plurality of clusters, wherein the second plurality of reference signals further refine a corresponding weighted index of each of the two or more clusters of the plurality of clusters.

In Aspect 21, the apparatus of any of Aspects 14-20 further includes that a number of clusters within the plurality of clusters of the RIS is adjusted based on a link between the base station and the RIS, an application type, a bandwidth part, component carriers, frequency band and range, or a combination thereof.

In Aspect 22, the apparatus of any of Aspects 14-21 further includes that the cluster configuration further comprises activation of a random selection of one or more clusters based on a first probability p1, wherein activation of one or more active elements within a respective one of the random selection of the one or more clusters is based on a second probability p2.

In Aspect 23, the apparatus of any of Aspects 14-22 further includes that the set or group of clusters of the plurality of clusters is activated for a period of time, wherein the cluster configuration indicates an amount of reference signals to perform the beam training procedure based at least on a number of active elements within each cluster.

Aspect 24 is a method for wireless communication for implementing any of Aspects 14-23.

Aspect 25 is an apparatus for wireless communication including means for implementing a method or realizing an apparatus as in any of Aspects 14-23.

Aspect 26 is a non-transitory computer readable medium storing computer executable code, where the code executed by a processor causes the processor to implement any of Aspect 14-23.

Aspect 27 is an apparatus for wireless communication at a RIS including at least one processor coupled to a memory and configured to transmit, via a RIS controller, a cluster configuration of the RIS comprising a plurality of clusters; receive, from a base station or a UE, a sequence of a plurality of reference signals as part of a beam training procedure at each cluster of the plurality of clusters; receive, from the base station or the UE, an indication indicating a selected set or group of clusters of the plurality of clusters; and reflect a signal from the base station or the UE using the selected set or group of clusters of the plurality of clusters.

In Aspect 28, the apparatus of Aspect 27 further includes a transceiver coupled to the at least one processor.

In Aspect 29, the apparatus of Aspects 27 or 28 further includes that each cluster of the plurality of clusters is activated individually to receive the sequence of the plurality of reference signals.

In Aspect 30, the apparatus of any of Aspects 27-29 further configured to receive a second sequence of reference signals to train the selected set or group of clusters.

In Aspect 31, the apparatus of any of Aspects 27-30 further includes that the selected set or group of clusters is based on at least one of signal strength, SNR, SINR, MCS, CQI, RSRP, RSRQ, or a combination thereof.

In Aspect 32, the apparatus of any of Aspects 27-31 further includes that each cluster of the plurality of clusters comprises a plurality of active elements further configured to apply a weight to each of the plurality of active elements of each cluster.

In Aspect 33, the apparatus of any of Aspects 27-32 further includes that if two or more clusters of the plurality of clusters are simultaneously activated further configured to transmit, via the RIS controller, a second plurality of reference signals corresponding to each of the two or more clusters of the plurality of clusters, wherein the second plurality of reference signals further refine corresponding weights of each of the two or more clusters of the plurality of clusters.

In Aspect 34, the apparatus of any of Aspects 27-33 further includes that a number of clusters within the plurality of clusters of the RIS is adjusted based on a link type, an application type, a bandwidth part, component carriers, frequency band and range, or a combination thereof.

In Aspect 35, the apparatus of any of Aspects 27-34 further includes that the cluster configuration further comprises activation of a random selection of one or more clusters based on a first probability p1, wherein activation of one or more active elements within a respective one of the random selection of the one or more clusters is based on a second probability p2.

In Aspect 36, the apparatus of any of Aspects 27-35 further includes that a cluster of the plurality of clusters is activated based on a probability Pk and a binary vector, wherein the selected set or group of clusters of the plurality of clusters is activated for a period of time, wherein the cluster configuration indicates an amount of reference signals to perform the beam training procedure based at least on a number of active elements within each cluster.

Aspect 37 is a method for wireless communication for implementing any of Aspects 27-36.

Aspect 38 is an apparatus for wireless communication including means for implementing a method or realizing an apparatus as in any of Aspects 27-36.

Aspect 39 is a non-transitory computer readable medium storing computer executable code, where the code executed by a processor causes the processor to implement any of Aspect 27-36.

What is claimed is:

1. An apparatus for wireless communication at a user equipment (UE), comprising:
  a memory; and
  at least one processor coupled to the memory and configured to:
    receive, from a reconfigurable intelligent surface (RIS) controller, a cluster configuration of a RIS comprising a plurality of clusters,
      wherein the cluster configuration further comprises activation of a random selection of one or more clusters based on a first probability p1,
      wherein activation of one or more active elements within a respective one of the random selection of the one or more clusters is based on a second probability p2;
    perform a beam training procedure on the plurality of clusters of the RIS, the beam training procedure including transmission of a sequence of a plurality of reference signals to each cluster of the plurality of clusters;

US 12,689,424 B2

39 transmit, to a base station, a feedback indication indicating an optimal configuration for each cluster of the plurality of clusters based at least on the beam training procedure; and receive a downlink signal reflected by a set or group of clusters of the RIS from the base station.

2. The apparatus of claim 1, further comprising a transceiver coupled to the at least one processor.

3. The apparatus of claim 1, wherein the at least one processor is further configured to:

select the set or group of clusters of the plurality of clusters; and perform a second beam training procedure on the selected set or group of clusters using a sequence of reference signals.

4. The apparatus of claim 1, wherein the selected set or group of clusters is based on at least one of signal strength, signal to noise ratio (SNR), signal to interference plus noise ratio (SINR), modulation and coding scheme (MCS), channel quality indicator (CQI), reference signal received power (RSRP), reference signal received quality (RSRQ), or a combination thereof.

5. The apparatus of claim 1, wherein each cluster of the plurality of clusters comprises a plurality of active elements, wherein a weight is applied to each of the plurality of active elements of each cluster.

6. The apparatus of claim 1, wherein if two or more clusters of the plurality of clusters are simultaneously activated, the at least one processor is further configured to:

receive, from the RIS controller, a second plurality of reference signals corresponding to each of the two or more clusters of the plurality of clusters, wherein the second plurality of reference signals further refine corresponding weights for each of the two or more clusters of the plurality of clusters.

7. The apparatus of claim 1, wherein the at least one processor is further configured to:

transmit an indication of at least one selected set or group of clusters of the plurality of clusters based at least on the beam training procedure, wherein the at least one selected set or group of clusters of the plurality of clusters is configured via radio resource control (RRC), medium access control-control element (MAC-CE), or downlink control information (DCI).

8. The apparatus of claim 1, wherein a number of clusters within the plurality of clusters of the RIS is adjusted based on at least one of a link between the UE and the RIS, an application type, a bandwidth part, component carriers, frequency band and range, or a combination thereof.

9. The apparatus of claim 1, wherein the set or group of clusters of the plurality of clusters is activated for a period of time, wherein the cluster configuration indicates an amount of reference signals to perform the beam training procedure based at least on a number of active elements within each cluster.

10. An apparatus for wireless communication at a base station, comprising:

a memory; and at least one processor coupled to the memory and configured to:

receive, from a reconfigurable intelligent surface (RIS) controller, a cluster configuration of the RIS comprising a plurality of clusters, wherein the cluster configuration further comprises activation of a random selection of one or more clusters based on a first probability p1,

40 wherein activation of one or more active elements within a respective one of the random selection of the one or more clusters is based on a second probability p2;

perform a beam training procedure on the plurality of clusters of the RIS, the beam training procedure including transmission of a sequence of a plurality of reference signals to each cluster of the plurality of clusters;

select a set or group of clusters of the plurality of clusters of the RIS based at least on the beam training procedure; and transmit, to the selected set or group of clusters of the RIS, a downlink signal for reflection to a user equipment (UE).

11. The apparatus of claim 10, further comprising a transceiver coupled to the at least one processor.

12. The apparatus of claim 10, wherein the at least one processor is further configured to:

performing a second beam training procedure on the selected set or group of clusters using a sequence of reference signals.

13. The apparatus of claim 10, wherein the selected set or group of clusters is based on at least one of signal strength, signal to noise ratio (SNR), signal to interference plus noise ratio (SINR), modulation and coding scheme (MCS), channel quality indicator (CQI), reference signal received power (RSRP), reference signal received quality (RSRQ), or a combination thereof.

14. The apparatus of claim 10, wherein each cluster of the plurality of clusters comprises a plurality of active elements, wherein a weight is applied to each of the plurality of active elements of each cluster.

15. The apparatus of claim 10, wherein to select the set or group of clusters the at least one processor is further configured to:

receive a feedback indication from a UE indicating an optimal configuration for each cluster of the plurality of clusters, or determine the set or group of clusters based on measurements of the plurality of reference signals of the beam training procedure.

16. The apparatus of claim 10, wherein if two or more clusters of the plurality of clusters are simultaneously activated, the at least one processor is further configured to:

receive, from the RIS controller, a second plurality of reference signals corresponding to each of the two or more clusters of the plurality of clusters, wherein the second plurality of reference signals further refine a corresponding weighted index of each of the two or more clusters of the plurality of clusters.

17. The apparatus of claim 10, wherein a number of clusters within the plurality of clusters of the RIS is adjusted based on a link between the base station and the RIS, an application type, a bandwidth part, component carriers, frequency band and range, or a combination thereof.

18. The apparatus of claim 10, wherein the set or group of clusters of the plurality of clusters is activated for a period of time, wherein the cluster configuration indicates an amount of reference signals to perform the beam training procedure based at least on a number of active elements within each cluster.

19. An apparatus for wireless communication at a reconfigurable intelligent surface (RIS), comprising:

a memory; and at least one processor coupled to the memory and configured to:

transmit, via a RIS controller, a cluster configuration of the RIS comprising a plurality of clusters, wherein the cluster configuration further comprises activation of a random selection of one or more clusters based on a first probability p1, wherein activation of one or more active elements within a respective one of the random selection of the one or more clusters is based on a second probability p2;

receive, from a base station or a user equipment (UE), a sequence of a plurality of reference signals as part of a beam training procedure at each cluster of the plurality of clusters;

receive, from the base station or the UE, an indication indicating a selected set or group of clusters of the plurality of clusters; and reflect a signal from the base station or the UE using the selected set or group of clusters of the plurality of clusters.

20. The apparatus of claim 19, further comprising a transceiver coupled to the at least one processor.

21. The apparatus of claim 19, wherein each cluster of the plurality of clusters is activated individually to receive the sequence of the plurality of reference signals.

22. The apparatus of claim 19, wherein the at least one processor is further configured to:

receive a second sequence of reference signals to train the selected set or group of clusters.

23. The apparatus of claim 19, wherein the selected set or group of clusters is based on at least one of signal strength, signal to noise ratio (SNR), signal to interference plus noise ratio (SINR), modulation and coding scheme (MCS), channel quality indicator (CQI), reference signal received power (RSRP), reference signal received quality (RSRQ), or a combination thereof.

24. The apparatus of claim 19, wherein each cluster of the plurality of clusters comprises a plurality of active elements, the at least one processor further configured to:

apply a weight to each of the plurality of active elements of each cluster.

25. The apparatus of claim 19, wherein if two or more clusters of the plurality of clusters are simultaneously activated, the at least one processor is further configured to:

transmit, via the RIS controller, a second plurality of reference signals corresponding to each of the two or more clusters of the plurality of clusters, wherein the second plurality of reference signals further refine a corresponding weighted index of each of the two or more clusters of the plurality of clusters.

26. The apparatus of claim 19, wherein a number of clusters within the plurality of clusters of the RIS is adjusted based on a link type, an application type, a bandwidth part, component carriers, frequency band and range, or a combination thereof.

27. The apparatus of claim 19, wherein a cluster of the plurality of clusters is activated based on a probability Pk and a binary vector, wherein the selected set or group of clusters of the plurality of clusters is activated for a period of time, wherein the cluster configuration indicates an amount of reference signals to perform the beam training procedure based at least on a number of active elements within each cluster.

* * * * *